US010278022B2

(12) United States Patent
Zhou et al.

(10) Patent No.: US 10,278,022 B2
(45) Date of Patent: Apr. 30, 2019

(54) COMMUNICATION DEFERRAL POLICIES TO INCREASE REUSE

(71) Applicant: QUALCOMM Incorporated, San Diego, CA (US)

(72) Inventors: Yan Zhou, San Diego, CA (US); Gwendolyn Denise Barriac, Encinitas, CA (US); Simone Merlin, San Diego, CA (US); George Cherian, San Diego, CA (US); Alfred Asterjadhi, San Diego, CA (US); Qingjiang Tian, San Diego, CA (US); Gang Ding, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 15/147,793

(22) Filed: May 5, 2016

(65) Prior Publication Data

US 2016/0330663 A1     Nov. 10, 2016

Related U.S. Application Data

(60) Provisional application No. 62/157,898, filed on May 6, 2015.

(51) Int. Cl.
| | |
|---|---|
| *H04W 4/02* | (2018.01) |
| *H04W 74/08* | (2009.01) |
| *H04W 74/00* | (2009.01) |
| *H04W 84/12* | (2009.01) |
| *H04W 48/12* | (2009.01) |

(52) U.S. Cl.
CPC ....... *H04W 4/025* (2013.01); *H04W 74/0816* (2013.01); *H04W 48/12* (2013.01); *H04W 74/006* (2013.01); *H04W 84/12* (2013.01)

(58) Field of Classification Search
CPC .............. H04W 4/025; H04W 74/006; H04W 74/0816; H04W 84/12; H04W 48/12
See application file for complete search history.

(56) References Cited

U.S. PATENT DOCUMENTS

| | | | |
|---|---|---|---|
| 2003/0123405 A1 | 7/2003 | Prado et al. | |
| 2006/0165114 A1* | 7/2006 | Diepstraten | H04W 28/26 370/445 |
| 2007/0133489 A1 | 6/2007 | Ramesh et al. | |
| (Continued) | | | |

OTHER PUBLICATIONS

International Search Report and Written Opinion—PCT/US2016/031326—ISA/EPO—dated Aug. 8, 2016.

*Primary Examiner* — Siming Liu
(74) *Attorney, Agent, or Firm* — Arent Fox, LLP and Qualcomm, Incorporated

(57) ABSTRACT

A method, an apparatus, and a computer-readable medium for wireless communication are provided. The apparatus is configured to determine a communication deferral policy within a BSS associated with the apparatus. The apparatus is configured to receive a message from a second wireless device. The apparatus is configured to determine a message type of the message. The apparatus is configured to determine whether the message is associated with an OBSS based on the determined message type. The apparatus is configured to determine whether to defer communications based on the communication deferral policy, the message type, and whether the message is associated with the OBSS.

31 Claims, 13 Drawing Sheets

(56) References Cited

U.S. PATENT DOCUMENTS

| | | | |
|---|---|---|---|
| 2012/0099449 A1* | 4/2012 | Madan | H04W 74/0816 |
| | | | 370/252 |
| 2014/0119288 A1* | 5/2014 | Zhu | H04W 72/0406 |
| | | | 370/329 |
| 2014/0328191 A1 | 11/2014 | Barriac et al. | |
| 2015/0045061 A1* | 2/2015 | Da | H04W 4/023 |
| | | | 455/456.2 |
| 2015/0078299 A1 | 3/2015 | Barriac et al. | |
| 2015/0381512 A1* | 12/2015 | Park | H04W 72/12 |
| | | | 370/445 |
| 2016/0081042 A1* | 3/2016 | Choudhury | H04W 24/02 |
| | | | 370/252 |
| 2017/0134975 A1* | 5/2017 | Huang | H04W 24/08 |
| 2017/0353911 A1* | 12/2017 | Wikstrom | H04W 48/02 |

\* cited by examiner

|  | Wireless device 414<br>BSS ax device | Wireless device 416<br>BSS legacy device | Wireless device 418<br>OBSS ax device | Wireless device 420<br>OBSS legacy device |
|---|---|---|---|---|
| Wireless device 410<br>BSS ax device | defer | defer | need not defer | need not defer |
| Wireless device 412<br>BSS legacy device | defer | defer | need not defer | defer |

FIG. 4

| legacy preamble | 11ax preamble with BSS identifier field | MAC portion for RTS content |

| legacy preamble | 11ax preamble with BSS identifier field | MAC portion for CTS content |

COMMUNICATION DEFERRAL POLICIES TO INCREASE REUSE

CROSS-REFERENCE TO RELATED APPLICATION(S)

This application claims the benefit of U.S. Provisional Application Ser. No. 62/157,898, entitled "COMMUNICATION DEFERRAL BASED ON REQUEST TO SEND AND CLEAR TO SEND MESSAGES" and filed on May 6, 2015, which is expressly incorporated by reference herein in its entirety.

BACKGROUND

Field

The present disclosure relates generally to communication systems, and more particularly, to communication deferral policies to increase reuse. For example, communication deferral may be based on received messages, such as request to send (RTS) messages, clear to send (CTS) messages, data messages, or other types of messages. This disclosure provides different techniques for determining when to defer communication based on received messages.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), wireless wide area network (WWAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable medium, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., a station (STA) or an access point (AP)) for wireless communication. The apparatus may be a STA. The apparatus is configured to determine a communication deferral policy within a basic service set associated with the apparatus. The apparatus is configured to receive a message from a second wireless device. The apparatus is configured to determine a message type of the message. The apparatus is configured to determine whether the message is associated with an overlapping basic service set (OBSS) based on the determined message type. The apparatus is configured to determine whether to defer communications based on the communication deferral policy, the message type, and whether the message is associated with the OBSS.

Another aspect of this disclosure provides an apparatus (e.g., an AP) for wireless communication. The apparatus may be an AP. The apparatus is configured to determine a communication deferral policy for a group of STAs within a BSS associated with the apparatus. The apparatus is configured to transmit a configuration message to the group of STAs, and the configuration message indicates the communication deferral policy.

In one embodiment, a method of wireless communication by an AP is provided. The method may include determining a communication deferral policy for a group of STAs within a BSS associated with the AP and transmitting a configuration message to the group of STAs, in which the configuration message indicates the communication deferral policy. In one configuration, the determining the communication deferral policy may include determining whether the group of STAs will defer to OBSS transmissions based on one or more conditions. In an aspect, the one or more conditions may include an effective BSS distance between the BSS and an OBSS. In another aspect, the communication deferral policy may instruct each STA within the group of STAs to defer communications when each STA receives a message from another STA in the BSS. In another aspect, the communication deferral policy may further instruct each STA within the group of STAs not to defer communications, when each STA receives the message from the another STA, based on at least one of whether the message is from an OBSS, the another STA is of a first device type or a second device type, a received signal strength of the message is below a threshold, the received signal strength of the message is below a second threshold indicated in the message, or requirements for non-deferral are met. In another aspect, the communication deferral policy may instruct the group of STAs whether to allow OBSS reuse based on a set of conditions. In another aspect, the group of STAs may be selected based on a distance from the AP. In another aspect, the configuration message may include a group indicator associated with the group of STAs, and the group of STAs may be a subset of STAs in the BSS. In another aspect, the communication deferral policy may be based on a second communication deferral policy of a second AP. In another configuration, the determining the communication deferral policy may include negotiating the communication deferral policy with a second AP.

In another embodiment, an AP for wireless communication is provided. The AP may include means for determining a communication deferral policy for a group of STAs within a BSS associated with the AP and means for transmitting a configuration message to the group of STAs, in which the configuration message indicates the communication deferral policy. In one configuration, the means for determining the communication deferral policy may be configured to determine whether the group of STAs will defer to OBSS transmissions based on one or more conditions. In another aspect, the one or more conditions may include an effective BSS distance between the BSS and an OBSS. In an aspect, the communication deferral policy may instruct each STA within the group of STAs to defer communications when each STA receives a message from another STA in the BSS. In another aspect, the communication deferral policy may further instruct each STA within the group of STAs not to defer communications, when each STA receives the message from the another STA, based on at least one of whether the message is from an OBSS, the another STA is of a first device type or a second device type, a received signal strength of the message is below a threshold, the received signal strength of the message is below a second threshold indicated in the message, or requirements for non-deferral are met. In another aspect, the communication deferral policy may instruct the group of STAs whether to allow OBSS reuse based on a set of conditions. In another aspect, the group of STAs may be selected based on a distance from the AP. In another aspect, the configuration message may include a group indicator associated with the group of STAs, and the group of STAs may be a subset of STAs in the BSS. In another aspect, the communication deferral policy may be based on a second communication deferral policy of a second AP. In another configuration, the means for determining the communication deferral policy may be configured to negotiate the communication deferral policy with a second AP.

In another embodiment, an AP for wireless communication is provided. The AP may include a memory and at least one processor coupled to the memory and configured to determine a communication deferral policy for a group of STAs within a BSS associated with the AP and to transmit a configuration message to the group of STAs, in which the configuration message indicates the communication deferral policy. In one configuration, the at least one processor may be configured to determine the communication deferral policy by determining whether the group of STAs will defer to OBSS transmissions based on one or more conditions. In another aspect, the one or more conditions may include an effective BSS distance between the BSS and an OBSS. In an aspect, the communication deferral policy may instruct each STA within the group of STAs to defer communications when each STA receives a message from another STA in the BSS. In another aspect, the communication deferral policy may further instruct each STA within the group of STAs not to defer communications, when each STA receives the message from the another STA, based on at least one of whether the message is from an OBSS, the another STA is of a first device type or a second device type, a received signal strength of the message is below a threshold, the received signal strength of the message is below a second threshold indicated in the message, or requirements for non-deferral are met. In another aspect, the communication deferral policy may instruct the group of STAs whether to allow OBSS reuse based on a set of conditions. In another aspect, the group of STAs may be selected based on a distance from the AP. In another aspect, the configuration message may include a group indicator associated with the group of STAs, and the group of STAs may be a subset of STAs in the BSS. In another aspect, the communication deferral policy may be based on a second communication deferral policy of a second AP. In another configuration, the at least one processor may be configured to determine the communication deferral policy by negotiating the communication deferral policy with a second AP.

In another embodiment, a computer-readable medium of AP storing computer executable code is provided. The computer-readable medium may include code to determine a communication deferral policy for a group of STAs within a BSS associated with the AP and to transmit a configuration message to the group of STAs, in which the configuration message indicates the communication deferral policy.

BRIEF DESCRIPTION OF THE DRAWINGS

FIG. 4 is a table illustrating a third exemplary method of RTS/CTS operation.

DETAILED DESCRIPTION

Figure 1:
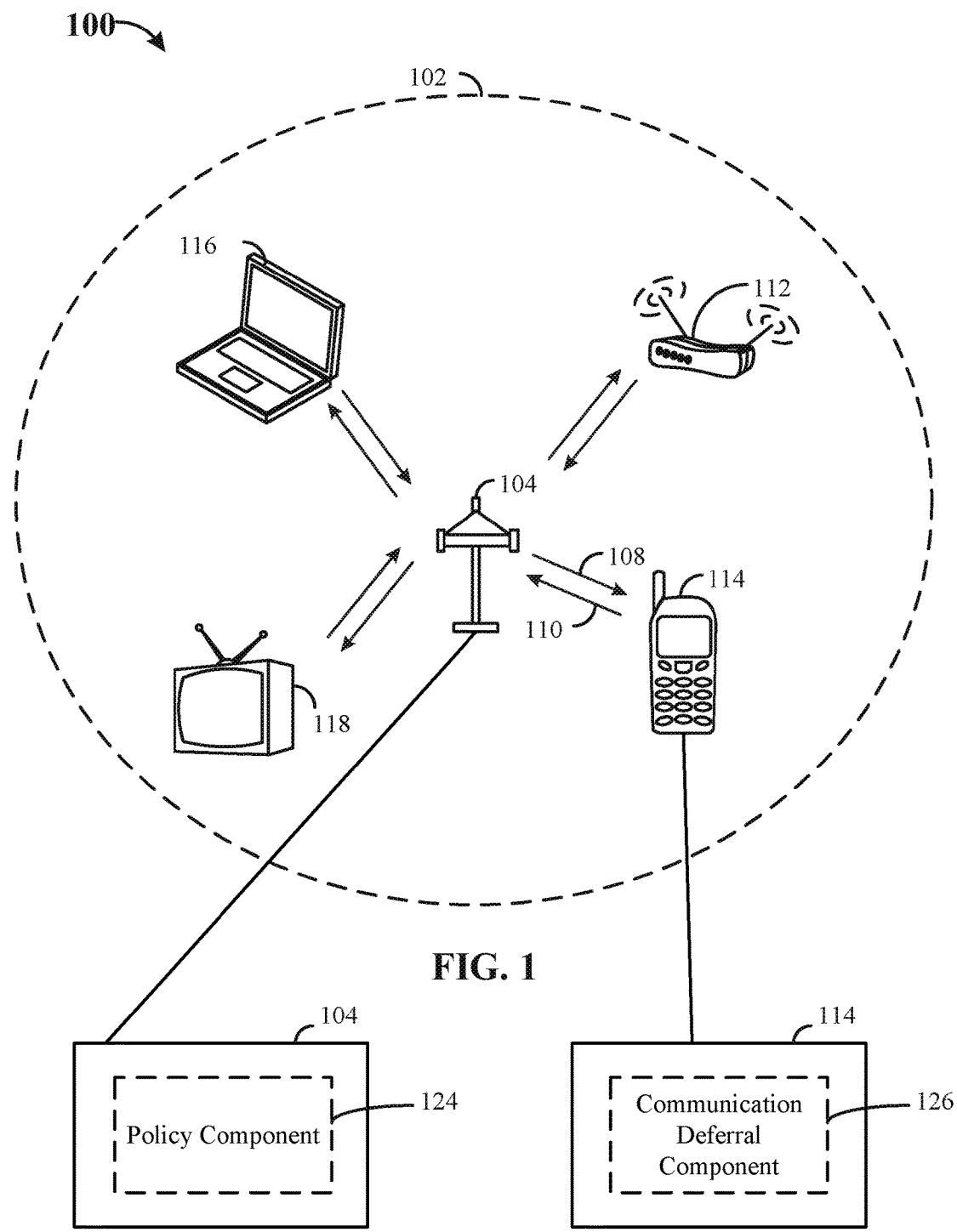
FIG. 1 shows an example wireless communication system in which aspects of the present disclosure may be employed.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, comp, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a STA may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard and/or the Long Term Evolution (LTE) standard, for example. Such devices, whether used as a STA or an AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to one or more wireless standards, for example the 802.11 standard and/or the LTE standard. The wireless communication system 100 may include an AP 104, which communicates with STAs (e.g., STAs 112, 114, 116, and 118). In aspect, the AP 104 may be an access point in a WLAN or a base station (e.g., an evolved Node B) in an LTE network, for example.

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, either from the beacon or probe response frames, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the STA 114 may include one or more components for performing various functions. For example, the STA 114 may include a communication deferral component 126 configured to perform procedures related to determining whether to defer communications. The communication deferral component 126 may be configured to determine a communication deferral policy within a BSS associated with the STA 114. The communication deferral component 126 may be configured to receive a message from a second wireless device. The communication deferral component 126 may be configured to determine a message type of the message. The communication deferral component 126 may be configured to determine whether the message is associated with an OBSS based on the determined message type. The communication deferral component 126 may be configured to determine whether to defer communications based on the communication deferral policy, the message type, and whether the message is associated with the OBSS. In another aspect, the AP 104 may include a communication deferral component that performs the same functionality as described with respect to the communication deferral component 126.

In another aspect, the AP 104 may include one or more component for performing various functions. For example, the AP 104 may include a policy component 124 configured to determine a communication deferral policy. The policy component 124 may be configured to determine a communication deferral policy for a group of STAs within a BSS associated with the AP 104. The policy component 124 may be configured to transmit a configuration message to the group of STAs, and the configuration message may indicate the communication deferral policy.

To manage data flows in a wireless network (e.g., including in future IEEE 802.11 standards), wireless devices may transmit an RTS message to indicate an intention to transmit data and a CTS message, in response to receiving an RTS message, to indicate an availability to receive data. RTS and CTS messages may be useful in dense networks to reduce collisions and eliminate hidden nodes. However, using RTS and CTS messages in dense networks may over suppress the network leading to poor throughput. When wireless devices are in close proximity, the wireless devices may be more likely to detect RTS and/or CTS messages associated with OBSSs, which may cause the wireless devices to defer communication more often. A need exists to for an RTS/CTS message that allows increased reuse. By using RTS/CTS messages that allow increased reuse, wireless devices may retain the benefit of RTS/CTS messages, including reducing hidden nodes and induced hidden nodes, while simultaneously allow more reuse and thus increasing throughput. The effects of carrier sense multiple access (CSMA) collisions may also mitigated.

As discussed in further detail below, a way to increase reuse in RTS/CTS messages is to add information into the RTS/CTS messages. BSS identifier (BSSID) information may be added into the RTS/CTS messages to enable a receiver to determine whether the RTS/CTS message is from a BSS or an OBSS. Additionally, information to distinguish between a legacy RTS/CTS message (e.g., an RTS/CTS in IEEE 802.11a, 802.11ac) and RTS/CTS messages related to future IEEE 802.11 standards (e.g., IEEE 802.11ax) may be added to create different types of RTS/CTS messages that are used to enable different operations with respect to the different types of RTS/CTS messages. References to IEEE 802.11ax herein are intended as an exemplary reference to future IEEE 802.11 standards. In an aspect, methods and rules may be defined such that wireless devices may choose to ignore and to transmit over other wireless devices transmitting OBSS RTS/CTS messages and the accompanying data packets, while deferring to in-BSS RTS/CTS messages and data packets. In another aspect, the decision to ignore OBSS RTS/CTS messages and accompanying data packets may be based on different factors. The decision may be based on whether the RTS/CTS message is from an OBSS.

The decision may be based on a type of wireless device from which the RTS/CTS message/data packet was received. The decision may be based on a type of RTS/CTS message. For example, a wireless device may ignore (e.g., choose not to defer to) RTS/CTS/data packets that are transmitted by an IEEE 802.11ax compatible device in the OBSS. The decision may be based on a received signal strength indicator (RSSI) or a signal-interference to noise ratio (SINR) from the RTS/CTS message/data packet. In an aspect, a wireless device may ignore an OBSS RTS/CTS message/data packet if the RSSI of the OBSS RTS/CTS message/data packet is less than an RSSI threshold or if the SINR of the OBSS RTS/CTS message/data packet is less than a SINR threshold. The RSSI threshold and/or SINR threshold may be different for a RTS message, a CTS message, and/or a data packet. For example, an OBSS RTS message may be ignored if the $RSSI_{RTS}$ is less than an RTS RSSI threshold, and an OBSS CTS message may be ignored if the $RSSI_{CTS}$ is less than a CTS RSSI threshold. In another aspect, the wireless device may determine not to defer communications if both the RSSI of the RTS message is less than an RTS RSSI threshold and the RSSI of the CTS message is less than a CTS RSSI threshold. In another aspect, the wireless device may determine not to defer communications if both the SINR of the RTS message is less than an RTS SINR threshold and the SINR of the CTS message is less than a CTS SINR threshold. In another aspect, different devices may have different thresholds. For example, the wireless device may use a different threshold/thresholds than another wireless device. The decision to ignore an OBSS RTS/CTS message/data packet may also depend on a distance from the wireless device to a serving AP, or an RSSI from the wireless device to the serving AP. A wireless device that is closer to the serving AP may be willing to accept higher OBSS RTS/CTS message/data packet RSSI/SINR thresholds because the wireless device is more likely to be able to successfully transmit to or receive from the serving AP. By contrast, a wireless device that is further away from the serving AP may be less tolerant and may ignore OBSS RTS/CTS messages/data packets if such transmissions are received below a lower RSSI/SINR threshold. In another aspect, the various thresholds for each wireless device may be the same across a BSS or across the network. In another aspect, the various thresholds may vary based on the IEEE 802.11 standard compatibility. A wireless device compatible with the IEEE 802.11a/ac standard may utilize different thresholds than another wireless device that is compatible with future IEEE 802.11 standards (e.g., the IEEE 802.11ax standard).

In another aspect, an RTS/CTS message transmitted by the wireless device may indicate whether the RTS/CTS message allows OBSS devices to transmit on top of the RTS/CTS message/data packet. The RTS/CTS message may indicate a set of conditions under which the RTS/CTS message allows OBSS wireless devices to transmit on top of the RTS/CTS message/data packet. In one example, the RTS/CTS message may include RSSI thresholds to be used for determining whether an RTS/CTS message may be ignored. The RSSI threshold for an RTS message may be different from the RSSI threshold for a CTS message. In another example, the RTS/CTS message may include SINR margins needed for the data packet, and the SINR margins may be used for determining whether an OBSS packet may be ignored. The RTS/CTS message may include the modulation coding scheme (MCS) of the data transmission, which may be used to determine an amount of tolerable interference. In yet another example, the RTS/CTS message may include a transmission power of the RTS/CTS message to enable the wireless device to determine how much interference the wireless device would cause to the transmitter of the message, and hence whether to defer communications.

Figure 2:
FIG. 2 is a table illustrating a first exemplary method of RTS/CTS operation.

FIG. 2 is a table 200 illustrating a first exemplary method of RTS/CTS operation. Referring to the table 200, a wireless device 210 may be of a first device type (e.g., an 802.11ax compatible STA or AP). A wireless device 212 may be of a second device type (e.g., not 802.11ax compatible) and in the same BSS as the wireless device 210. The wireless device 210 may have data to transmit. Before transmitting, the wireless device 210 may detect an RTS message, a CTS message, and/or a data packet transmitted by a second wireless device, which may be any one of the wireless devices 214, 216, 218, and 220. The wireless device 214 may be of the first device type (e.g., 802.11ax compatible) and the wireless device 216 maybe of the second device type (e.g., not 802.11ax compatible). The wireless devices 214, 216 may be in the same BSS as the wireless device 210. The wireless device 218 may be of the first device type and the wireless device 220 maybe of the second device type. The wireless devices 218, 220 may be in an OBSS with respect to the wireless device 210 and the wireless device 212.

Upon detecting the RTS message, the CTS message, and/or the data packet from the second wireless device, the wireless device 210 may determine whether to defer communications based on a communication deferral policy, which may instruct the wireless device 210 to defer communications based on the BSS from which the transmission was sent and/or other factors. The communication deferral policy may be the same for an entire network, or the communication deferral policy may be different from one BSS to another BSS. The communication deferral policy may be determined by a serving AP of the BSS or preconfigured within the wireless device 210. The communication deferral policy may be transmitted to a STA from an AP in a configuration message or preconfigured within the STA and/or the AP. In an aspect, when the wireless device 210 determines to defer based on the communication deferral policy, the wireless device 210 may defer communications for a period of time that is equal to or greater than the duration of the received transmission. The communication deferral policy may explicitly indicate that if the wireless device 210 determines to defer, that the duration of the deferral is equal to or greater than the length of the received transmission.

Table 200 illustrates general guidelines associated with a first communication deferral policy. Under the first communication deferral policy, the wireless device 210 of the first device type needs to be able to distinguish between an OBSS RTS/CTS message and an in-BSS RTS/CTS message. However, the wireless device 210 need not distinguish between the first device type (e.g., an 802.11ax device) or the second device type (e.g., an 802.11a/ac device) because the first communication deferral policy does not consider device types in determining whether to defer communication. In the first communication deferral policy, the wireless device 210 may defer when the wireless device 210 detects in-BSS RTS/CTS message/data packet (e.g., from the wireless device 214 or the wireless device 216) but need not defer when the wireless device 210 detects an OBSS RTS/CTS message/data packet (e.g., from the wireless device 218 or the wireless device 220). As discussed below, the wireless device 210 may nevertheless defer to OBSS RTS/CTS messages/data packets based on characteristics or other information included in the RTS/CTS messages/data packets or based on other factors. Under the first communication deferral policy, the wireless device 210 defers to in-BSS messages to prevent in-BSS collisions. The wireless device 212 defers for in-BSS RTS/CTS messages and OBSS RTS/CTS messages because the wireless device 212 is of the second device type and may not be able to distinguish between an OBSS message and an in-BSS message. The wireless device 212, not being able to distinguish between an OBSS message or an in-BSS message, may defer.

Depending on the configuration of RTS/CTS messages used, the wireless device 210 may use different methods to determine whether the message received from the second wireless device is in-BSS or OBSS. In an aspect, there may be three types of RTS messages and three types of CTS messages. A first RTS type may include a receiver address field and a transmitter address field, and the receiver address field and/or the transmitter address field may include a BSSID. In an aspect, the first RTS type may be a legacy RTS message (e.g., an IEEE 802.11a/ac RTS message). A second RTS type may include all the aspects of the first RTS type and further include a device type indicator in one or more of the following fields: receiver address field, the transmitter address field, a scrambling seed field, a signal field, a service field, or a frame control field. In an aspect, the device type indicator may be the I/G bit in the receiver address field or the transmitter address field. In another aspect, the second RTS type may be a legacy RTS message that includes a device type indicator (e.g., indicating that the device is an IEEE 802.11ax device). A third RTS type may be an IEEE 802.11ax RTS message that includes at least one of a BSS identifier field and a device type indicator. The third RTS type may further include one or more of: an RSSI threshold that enables the wireless device 210 to determine whether non-deferral is allowed, an allowed interference level at the second wireless device or at an intended receiver of the RTS message to determine whether non-deferral is allowed, an MCS of data to be sent by the second wireless device, a set of performance requirements, or information about a buffer status associated with multiple traffic identifiers or access classes.

With respect to CTS types, a first CTS type may include a BSSID in a receiver address field if the wireless device 210 is a station, otherwise if the wireless device 210 is an AP, then the receiver address may include the address of a station and not a BSSID. In an aspect, the first CTS type may be a legacy CTS message (e.g., an IEEE 802.11a/ac CTS message). A second CTS type may include at least one of a BSSID or a device type indicator in the receiver address field, a scrambling seed field, a signal field, a service field, or a frame control field. In an aspect, the second CTS type may be a legacy CTS message that includes a BSSID and/or a device type indicator in one of the various fields. A third CTS type may be an IEEE 802.11ax compatible CTS message that includes at least one of a BSS identifier field and a device type indicator. The third CTS type may also include an RSSI threshold that enables the wireless device 210 to determine whether non-deferral is allowed, an allowed interference level at the second wireless device or at an intended receiver of the message to determine whether non-deferral is allowed, an MCS of data to be received by the second wireless device, and a set of performance requirements. Wireless devices of the first device type may use various combinations of the various RTS/CTS types. However, wireless devices of the second device type may use the first RTS type and the first CTS type. Five different configuration options of RTS/CTS messages are described below.

Option 1A: First RTS and CTS Type

In option 1A, the first device type (e.g., IEEE 802.11ax compatible products) uses the first RTS type (e.g., an IEEE 802.11a/ac RTS) and the first CTS type (e.g., an IEEE 802.11a/ac CTS). The second device type (e.g., IEEE 802.11a/ac product) uses the first RTS type and the first CTS type.

In this option, the wireless device 210 may determine the first communication deferral policy within a BSS associated with the wireless device 210. If the wireless device 210 is a STA, the wireless device 210 may receive a configuration message from a serving AP, and the configuration message may include the first communication deferral policy. The wireless device 210 may determine the first communication deferral policy by receiving the first communication deferral policy in the received configuration message. If the wireless device 210 is an AP, the wireless device 210 may determine the first communication deferral policy as further discussed below. In another aspect, the first communication deferral policy may be preconfigured into the wireless device 210.

After determining the first communication deferral policy, the wireless device 210 may receive a message from a second wireless device (e.g., a STA or an AP). The second wireless device may be one of the wireless devices 214, 216, 218, 220. In this option, the wireless devices 214, 218 of the first device type may use the first RTS type and the first CTS type. The wireless devices 216, 220 are of the second device type may use the first RTS type and the first CTS type. Upon receiving the message from the second wireless device, the wireless device 210 may determine a message type of the received message. In an aspect, the wireless device 210 may determine whether the received message is an RTS message, a CTS message, or a data packet. If the message is an RTS message or a CTS message, the wireless device 210 may determine if the message is one of three types of RTS messages or one of three types of CTS message. Based on the determined message type, the wireless device 210 may determine whether the message is associated with an OBSS or a BSS.

In one aspect, the wireless device 210 may determine that the message is an RTS message of the first RTS type (e.g., based on a message type indicated in the message and/or based on information contained in the message). The wireless device may determine whether the RTS message is associated with an OBSS or a BSS based on a BSSID in a receiver address (during uplink) or in a transmitter address of the RTS message (during downlink). If the BSSID is associated with the BSS, then the message is an in-BSS RTS message. If the BSSID is associated with an OBSS, then the message is an OBSS RTS message. In one aspect, if the message is an in-BSS RTS message (e.g., from the wireless devices 214, 216), then the wireless device 210 may determine to defer communications. In another aspect, if the message is an OBSS RTS message (e.g., from the wireless devices 218, 220), then the wireless device 210 may not defer communications. In another aspect, if the message is an OBSS RTS message, the wireless device 210 may consider one or more criteria/factors to determine whether to defer communications. For example, the wireless device 210 may determine an RSSI or a SINR of the message. The wireless device 210 may not defer if the received signal strength (e.g., the RSSI or the SINR) of the received message is below a first threshold and the received message is from an OBSS. The wireless device 210 may not defer if the received signal strength is below a RTS threshold and the received message is from an OBSS. The wireless device 210 may not defer if the received signal strength is below a second threshold associated with the wireless device 210. In another aspect, the wireless device 210 may defer if the message indicates that an OBSS device may not transmit on top of the message.

In another aspect, the wireless device 210 may determine that the message is a CTS message of the first CTS type (e.g., based on a message type indicator in the message and/or information contained in the message). If the message is sent in an uplink transmission, then the message may include a receiver address associated with a BSSID. Based on the BSSID, the wireless device 210 may determine whether the message is associated with an OBSS or BSS. If the message is sent in a downlink transmission, then the wireless device 210 may determine whether the message is an OBSS CTS message based on whether the message is received a SIFS after an OBSS RTS message. If the message is an in-BSS CTS message (e.g., from the wireless devices 214, 216), then the wireless device 210 may determine to defer communications. In one aspect, if the message is an OBSS CTS message (e.g., from the wireless devices 218, 220), then the wireless device 210 may not defer communications. In another aspect, if the message is an OBSS CTS message, the wireless device 210 may consider one or more criteria/factors to determine whether to defer communications. For example, the wireless device 210 may determine a received signal strength (e.g., an RSSI or SINR) of the message. The wireless device 210 may not defer if the received signal strength of the message is below a first threshold and the received message is from an OBSS, but defer otherwise. The wireless device 210 may not defer if the received signal strength is below a CTS threshold and the received message is from an OBSS, but defer otherwise. The wireless device 210 may not defer if the received signal strength is below a second threshold associated with the wireless device 210. In another aspect, the wireless device 210 may defer if the message indicates that an OBSS device may not transmit on top of the message.

In another aspect, the wireless device 210 may determine that the message is a data packet (e.g., based on indicators/fields included with the message). The wireless device 210 may determine whether the data packet is associated with an OBSS based on transmit and receive identifiers in the preamble and or the MAC header. There may also be BSS information directly in the preamble or MAC header. The wireless device 210 may determine whether the data packet is associated with an OBSS based on whether the data packet is linked to an OBSS RTS message. For example, if the wireless device 210 receives an OBSS RTS message, then receives an OBSS CTS message after a SIFS, and then receives the data packet after another SIFS, then the wireless device 210 may determine that the data packet is associated with an OBSS. In one aspect, if the message is a BSS data packet, then the wireless device may defer communications. In another aspect, if the message is an OBSS data packet, then the wireless device 210 may not defer communications. In this aspect, the wireless device 210 may cancel any network allocation vector set by a corresponding CTS message. In another aspect, if the message is an OBSS data packet, the wireless device 210 may not defer communications only if the data packet is from an OBSS and certain conditions on the RSSI of the data packet are met. In another aspect, if the message is an OBSS data packet, the wireless device 210 may not defer communications only if the wireless device 210 did not defer to the corresponding RTS and/or CTS messages, if the corresponding RTS and/or CTS messages were received.

Option 1B: First RTS and CTS Type with OBSS Color

In option 1B, the first device type (e.g., IEEE 802.11ax product) uses the first RTS type (e.g., an IEEE 802.11a/ac RTS) and the second CTS type (e.g., an IEEE 802.11a/ac CTS). Unlike the first CTS type, however, the second CTS type may always include a BSSID (or color information) in one or more fields. The second device type (e.g., IEEE 802.11a/ac product) uses the first RTS type and the first CTS type.

In this option, the wireless device 210 may determine the first communication deferral policy within a BSS associated with the wireless device 210. If the wireless device 210 is a STA, the wireless device 210 may receive a configuration message from a serving AP, and the configuration message may include the first communication deferral policy. The wireless device 210 may determine the first communication deferral policy by receiving the first communication deferral policy in the received configuration message. If the wireless device 210 is an AP, the wireless device 210 may determine the first communication deferral policy as further discussed below. In another aspect, the first communication deferral policy may be preconfigured into the wireless device 210.

After determining the first communication deferral policy, the wireless device 210 may receive a message from a second wireless device (e.g., a STA or an AP). The second wireless device may be one of the wireless devices 214, 216, 218, 220. In this option, the wireless devices 214, 218 of the first device type may use the first RTS type and the second CTS type. The wireless devices 216, 220 are of the second device type may use the first RTS type and the first CTS type. Upon receiving the message from the second wireless device, the wireless device 210 may determine a message type of the received message. In an aspect, the wireless device 210 may determine whether the received message is an RTS message, a CTS message, or a data packet. If the message is an RTS message or a CTS message, the wireless device 210 may determine if the message is one of three types of RTS messages or one of three types of CTS message. Based on the determined message type, the wireless device 210 may determine whether the message is associated with an OBSS or a BSS.

In one aspect, the wireless device 210 may determine that the message is an RTS message of the first RTS type (e.g., based on a message type indicated in the message and/or based on information contained in the message). The wireless device may determine whether the RTS message is associated with an OBSS or a BSS based on a BSSID in a receiver address (during uplink) or in a transmitter address of the RTS message (during downlink). If the BSSID is associated with the BSS, then the message is an in-BSS RTS message. If the BSSID is associated with an OBSS, then the message is an OBSS RTS message. If the message is an in-BSS RTS message (e.g., from the wireless devices 214, 216), then the wireless device 210 may determine to defer communications. In one aspect, if the message is an OBSS RTS message (e.g., from the wireless devices 218, 220), then the wireless device 210 may not defer communications. In another aspect, if the message is an OBSS RTS message, the wireless device 210 may consider one or more criteria/factors to determine whether to defer communications. For example, the wireless device 210 may determine an RSSI or a SINR of the message. The wireless device 210 may not defer if the received signal strength (e.g., the RSSI or the SINR) of the received message is below a first threshold and the received message is from an OBSS. The wireless device 210 may not defer if the received signal strength is below a RTS threshold and the received message is from an OBSS. The wireless device 210 may not defer if the received signal strength is below a second threshold associated with the wireless device 210. In another aspect, the wireless device 210 may defer if the message indicates that an OBSS device may not transmit on top of the message.

In another aspect, the wireless device 210 may determine that the message is a CTS message of the second CTS type (e.g., based on a message type indicator in the message and/or information contained in the message). The message may include a BSSID in one or more of the fields within the message. Further, if the message is sent in an uplink transmission, then the message may include a BSSID in a receiver address field. Based on the BSSID, the wireless device 210 may determine whether the message is associated with an OBSS or BSS. Also, the wireless device 210 may determine whether the message is an OBSS CTS message based on whether the message is received a SIFS after an OBSS RTS message. If the message is an in-BSS CTS message (e.g., from the wireless devices 214), then the wireless device 210 may determine to defer communications. In one aspect, if the message is an OBSS CTS message (e.g., from the wireless devices 218), then the wireless device 210 may not defer communications. In another aspect, if the message is an OBSS CTS message, the wireless device 210 may consider one or more criteria/factors to determine whether to defer communications. For example, the wireless device 210 may determine a received signal strength (e.g., an RSSI or SINR) of the message. The wireless device 210 may not defer if the received signal strength of the message is below a first threshold and the received message is from an OBSS. The wireless device 210 may not defer if the received signal strength is below a CTS threshold and the received message is from an OBSS. The wireless device 210 may not defer if the received signal strength is below a second threshold associated with the wireless device 210. In another aspect, the wireless device 210 may defer if the message indicates that an OBSS device may not transmit on top of the message. In another aspect, the wireless device 210 may determine whether to defer communications when the message is associated with an OBSS based on one or more conditions/criteria included in the message. The one or more conditions may indicate RSSI or SINR threshold for ignoring a CTS message, SINR margins needed for the RTS message, MCS of the data transmission, which may be used to determine an amount of tolerable interference, and/or a transmission power of the CTS message.

In another aspect, the wireless device 210 may determine that the message is a data packet (e.g., based on indicators/fields included with the message). The wireless device 210 may determine whether the data packet is associated with an OBSS based on the transmitter and/or receiver identifiers in the preamble and or MAC header. There may also be BSS information directly in the preamble or MAC header. The wireless device 210 may determine whether the data packet is associated with an OBSS based on whether the data packet is linked to an OBSS RTS message. For example, if the wireless device 210 receives an OBSS RTS message, then receives an OBSS CTS message after a SIFS, and then receives the data packet after another SIFS, then the wireless device 210 may determine that the data packet is associated with an OBSS. In one aspect, if the message is a BSS data packet, then the wireless device may defer communications. In another aspect, if the message is an OBSS data packet, then the wireless device 210 may not defer communications. In this aspect, the wireless device 210 may cancel any network allocation vector set by a corresponding CTS message. In another aspect, if the message is an OBSS data packet, the wireless device 210 may not defer communications only if the data packet is from an OBSS and certain conditions on the RSSI of the data packet are met. In another aspect, if the message is an OBSS data packet, the wireless device 210 may not defer communications only if the wireless device 210 did not defer to the corresponding RTS and/or CTS messages, if the corresponding RTS and/or CTS messages were received.

In an aspect, if the message is of the first RTS type or the first CTS type (e.g., from the wireless device 220), then option 1A describes the behavior of the wireless device 210.

Option 1C: First RTS Type and Third CTS Type with OBSS Color and NAV

In option 1C, the first device type (e.g., IEEE 802.11ax product) uses the first RTS type (e.g., an IEEE 802.11a/ac RTS) and the third CTS type (e.g., an IEEE 802.11ax CTS). In this option, the third CTS type may include a BSSID field (or color information field). The third CTS type may include a network allocation vector that is compatible with the second device type (e.g., an IEEE 802.11a/ac device). The second device type (e.g., IEEE 802.11a/ac product) uses the first RTS type and the first CTS type.

In this option, the wireless device 210 may determine the first communication deferral policy within a BSS associated with the wireless device 210. If the wireless device 210 is a STA, the wireless device 210 may receive a configuration message from a serving AP, and the configuration message may include the first communication deferral policy. The wireless device 210 may determine the first communication deferral policy by receiving the first communication deferral policy in the received configuration message. If the wireless device 210 is an AP, the wireless device 210 may determine the first communication deferral policy as further discussed below. In another aspect, the first communication deferral policy may be preconfigured into the wireless device 210.

After determining the first communication deferral policy, the wireless device 210 may receive a message from a second wireless device (e.g., a STA or an AP). The second wireless device may be one of the wireless devices 214, 216, 218, 220. In this option, the wireless devices 214, 218 of the first device type may use the first RTS type and the third CTS type. The wireless devices 216, 220 of the second device type may use the first RTS type and the first CTS type. Upon receiving the message from the second wireless device, the wireless device 210 may determine a message type of the received message. In an aspect, the wireless device 210 may determine whether the received message is an RTS message, a CTS message, or a data packet. If the message is an RTS message or a CTS message, the wireless device 210 may determine if the message is one of three types of RTS messages or one of three types of CTS message. Based on the determined message type, the wireless device 210 may determine whether the message is associated with an OBSS or a BSS.

In one aspect, the wireless device 210 may determine that the message is an RTS message of the first RTS type (e.g., based on a message type indicated in the message and/or based on information contained in the message). The wireless device may determine whether the RTS message is associated with an OBSS or a BSS based on a BSSID in a receiver address (during uplink) or in a transmitter address of the RTS message (during downlink). If the BSSID is associated with the BSS, then the message is an in-BSS RTS message. If the BSSID is associated with an OBSS, then the message is an OBSS RTS message. If the message is an in-BSS RTS message (e.g., from the wireless devices 214, 216), then the wireless device 210 may determine to defer communications. In one aspect, if the message is an OBSS RTS message (e.g., from the wireless devices 218, 220), then the wireless device 210 may not defer communications. In another aspect, if the message is an OBSS RTS message, the wireless device 210 may consider one or more criteria/factors to determine whether to defer communications. For example, the wireless device 210 may determine an RSSI or a SINR of the message. The wireless device 210 may not defer if the received signal strength (e.g., the RSSI or the SINR) of the received message is below a first threshold and the received message is from an OBSS. The wireless device 210 may not defer if the received signal strength is below a RTS threshold and the received message is from an OBSS. The wireless device 210 may not defer if the received signal strength is below a second threshold associated with the wireless device 210. In another aspect, the wireless device 210 may defer if the message indicates that an OBSS device may not transmit on top of the message.

In another aspect, the wireless device 210 may determine that the message is a CTS message of the third CTS type (e.g., based on a message type indicator in the message and/or information contained in the message). If the message is sent in an uplink transmission, then the message may include a BSSID in a receiver address field. The message also includes a BSSID field, and the wireless device 210 may determine BSSID based on a value in the BSSID field (or color information field) included in the message. Based on the BSSID, the wireless device 210 may determine whether the message is associated with an OBSS or BSS. If the message is an in-BSS CTS message (e.g., from the wireless device 214), then the wireless device 210 may determine to defer communications. In one aspect, if the message is an OBSS CTS message (e.g., from the wireless device 218), then the wireless device 210 may not defer communications. In another aspect, if the message is an OBSS CTS message, the wireless device 210 may consider one or more criteria/factors to determine whether to defer communications. For example, the wireless device 210 may determine a received signal strength (e.g., an RSSI or SINR) of the message. The wireless device 210 may not defer if the received signal strength of the message is below a first threshold and the received message is from an OBSS. The wireless device 210 may not defer if the received signal strength is below a CTS threshold and the received message is from an OBSS. The wireless device 210 may not defer if the received signal strength is below a second threshold associated with the wireless device 210. In another aspect, the wireless device 210 may defer if the message indicates that an OBSS device may not transmit on top of the message. In another aspect, the wireless device 210 may determine whether to defer communications when the message is associated with an OBSS based on one or more conditions/criteria included in the message. The one or more conditions may indicate RSSI or SINR threshold for ignoring a CTS message, SINR margins needed for the RTS message, MCS of the data transmission, which may be used to determine an amount of tolerable interference, and/or a transmission power of the CTS message.

In another aspect, the wireless device 210 may determine that the message is a data packet (e.g., based on indicators/fields included with the message). The wireless device 210 may determine whether the data packet is associated with an OBSS based on whether the data packet is linked to an OBSS RTS message or OBSS CTS message. For example, if the wireless device 210 receives an OBSS RTS message, then receives an OBSS CTS message after a SIFS, and then receives the data packet after another SIFS, then the wireless device 210 may determine that the data packet is associated with an OBSS. The wireless device 210 may determine whether the data packet is associated with an OBSS based on receive and transmit identifiers in the preamble or the MAC header. There may also be BSS information directly in the preamble or MAC header. In one aspect, if the message is a BSS data packet, then the wireless device may defer communications. In another aspect, if the message is an OBSS data packet, then the wireless device 210 may not defer communications. In this aspect, the wireless device 210 may cancel any network allocation vector set by a corresponding CTS message. In another aspect, if the message is an OBSS data packet, the wireless device 210 may not defer communications only if the data packet is from an OBSS and certain conditions on the RSSI of the packet are met. In another aspect, if the message is an OBSS data packet, the wireless device 210 may not defer communications only if the wireless device 210 did not defer to the corresponding RTS and/or CTS messages, if the corresponding RTS and/or CTS messages were received.

In an aspect, if the message is of the first CTS type (e.g., from the wireless device 220), then option 1A describes the behavior of the wireless device 210.

Option 1D: Third RTS Type and Third CTS Type with OBSS Color and NAV

In option 1D, the first device type (e.g., IEEE 802.11ax product) uses the third RTS type (e.g., an IEEE 802.11ax RTS) and the third CTS type (e.g., an IEEE 802.11ax CTS). In this option, both the third RTS type and the third CTS type may include a BSSID field (or color information field). The third CTS type may include a network allocation vector that is compatible with the second device type (e.g., an IEEE 802.11a/ac device). The third RTS type may include a network allocation vector that is compatible with the second device type. The second device type (e.g., IEEE 802.11a/ac product) uses the first RTS type and the first CTS type.

In this option, the wireless device 210 may determine the first communication deferral policy within a BSS associated with the wireless device 210. If the wireless device 210 is a STA, the wireless device 210 may receive a configuration message from a serving AP, and the configuration message may include the first communication deferral policy. The wireless device 210 may determine the first communication deferral policy by receiving the first communication deferral policy in the received configuration message. If the wireless device 210 is an AP, the wireless device 210 may determine the first communication deferral policy as further discussed below. In another aspect, the first communication deferral policy may be preconfigured into the wireless device 210.

After determining the first communication deferral policy, the wireless device 210 may receive a message from a second wireless device (e.g., a STA or an AP). The second wireless device may be one of the wireless devices 214, 216, 218, 220. In this option, the wireless devices 214, 218 of the first device type may use the third RTS type and the third CTS type. The wireless devices 216, 220 of the second device type may use the first RTS type and the first CTS type. Upon receiving the message from the second wireless device, the wireless device 210 may determine a message type of the received message. In an aspect, the wireless device 210 may determine whether the received message is an RTS message, a CTS message, or a data packet. If the message is an RTS message or a CTS message, the wireless device 210 may determine if the message is one of three types of RTS messages or one of three types of CTS message. Based on the determined message type, the wireless device 210 may determine whether the message is associated with an OBSS or a BSS.

In one aspect, the wireless device 210 may determine that the message is an RTS message of the third RTS type (e.g., based on a message type indicated in the message). The wireless device may determine whether the RTS message is associated with an OBSS or a BSS based on a value of a BSSID field or based on a BSSID in a receiver address (during uplink) or in a transmitter address of the RTS message (during downlink). If the BSSID is associated with the BSS, then the message is an in-BSS RTS message (e.g., from the wireless device 214). If the BSSID is associated with an OBSS, then the message is an OBSS RTS message (e.g., from the wireless device 218). If the message is an in-BSS RTS message, then the wireless device 210 may determine to defer communications. In one aspect, if the message is an OBSS RTS message, then the wireless device 210 may not defer communications. In another aspect, if the message is an OBSS RTS message, the wireless device 210 may consider one or more criteria/factors to determine whether to defer communications. For example, the wireless device 210 may determine an RSSI or SINR of the message. The wireless device 210 may not defer if the received signal strength (e.g., the RSSI or the SINR) of the received message is below a first threshold and the received message is from an OBSS. The wireless device 210 may not defer if the received signal strength is below a RTS threshold and the received message is from an OBSS. The wireless device 210 may not defer if the received signal strength is below a second threshold associated with the wireless device 210. In another aspect, the wireless device 210 may defer if the message indicates that an OBSS device may not transmit on top of the message. In another aspect, the wireless device 210 may determine whether to defer communications when the message is associated with an OBSS based on one or more conditions/criteria included in the message. The conditions may indicate an RSSI threshold for ignoring an RTS message, SINR margins needed for the RTS message, MCS of the data transmission, which may be used to determine an amount of tolerable interference, and/or a transmission power of the RTS message.

In another aspect, the wireless device 210 may determine that the message is a CTS message of the third CTS type (e.g., based on a message type indicator in the message and/or information contained in the message). If the message is sent in an uplink transmission, then the message may include a BSSID in a receiver address field. The message also includes a BSSID field, and the wireless device 210 may determine BSSID based on a value in the BSSID field (or color information field) included in the message. Based on the BSSID, the wireless device 210 may determine whether the message is associated with an OBSS or BSS. If the message is an in-BSS CTS message (e.g., from the wireless device 214), then the wireless device 210 may determine to defer communications. In one aspect, if the message is an OBSS CTS message (e.g., from the wireless device 218), then the wireless device 210 may not defer communications. In another aspect, if the message is an OBSS CTS message, the wireless device 210 may consider one or more criteria/factors to determine whether to defer communications. For example, the wireless device 210 may determine a received signal strength (e.g., an RSSI or SINR) of the message. The wireless device 210 may not defer if the received signal strength of the message is below a first threshold and the received message is from an OBSS. The wireless device 210 may not defer if the received signal strength is below a CTS threshold and the received message is from an OBSS. The wireless device 210 may not defer if the received signal strength is below a second threshold associated with the wireless device 210. In another aspect, the wireless device 210 may defer if the message indicates that an OBSS device may not transmit on top of the message. In another aspect, the wireless device 210 may determine whether to defer communications when the message is associated with an OBSS based on one or more conditions/criteria included in the message. The one or more conditions may indicate RSSI or SINR threshold for ignoring a CTS message, SINR margins needed for the RTS message, MCS of the data transmission, which may be used to determine an amount of tolerable interference, and/or a transmission power of the CTS message.

In another aspect, the wireless device 210 may determine that the message is a data packet (e.g., based on indicators/fields included with the message). The wireless device 210 may determine whether the data packet is associated with an OBSS based on whether the data packet is linked to an OBSS RTS message or an OBSS CTS message. For example, if the wireless device 210 receives an OBSS RTS message, then receives an OBSS CTS message after a SIFS, and then receives the data packet after another SIFS, then the wireless device 210 may determine that the data packet is associated with an OBSS. The wireless device 210 may determine whether the data packet is associated with an OBSS based on receive and transmit identifier information in the preamble and/or receive and transmit identifier information in the MAC header. There may also be BSS information directly in the preamble or MAC header. In one aspect, if the message is a BSS data packet, then the wireless device may defer communications. In another aspect, if the message is an OBSS data packet, then the wireless device 210 may not defer communications. In this aspect, the wireless device 210 may cancel any network allocation vector set by a corresponding CTS message. In another aspect, if the message is an OBSS data packet, then the wireless device 210 may not defer communications only if additional criteria such as RSSI restrictions are met. In another aspect, if the message is an OBSS data packet, then the wireless device 210 may not defer communication only if the wireless device 210 did not defer communications for the RTS and/or CTS messages (if received) associated with message.

In an aspect, if the message is of the first RTS type or the first CTS type (e.g., from the wireless device 220), then option 1A describes the behavior of the wireless device 210.

Option 1E: Third RTS Type and Second CTS Type

In option 1E, the first device type (e.g., IEEE 802.11ax product) uses the third RTS type (e.g., an IEEE 802.11ax RTS) and the second CTS type (e.g., an IEEE 802.11a/ac CTS). The second device type (e.g., IEEE 802.11a/ac product) uses the first RTS type and the first CTS type.

In this option, the wireless device 210 may determine the first communication deferral policy within a BSS associated with the wireless device 210. If the wireless device 210 is a STA, the wireless device 210 may receive a configuration message from a serving AP, and the configuration message may include the first communication deferral policy. The wireless device 210 may determine the first communication deferral policy by receiving the first communication deferral policy in the received configuration message. If the wireless device 210 is an AP, the wireless device 210 may determine the first communication deferral policy as further discussed below. In another aspect, the first communication deferral policy may be preconfigured into the wireless device 210.

After determining the first communication deferral policy, the wireless device 210 may receive a message from a second wireless device (e.g., a STA or an AP). The second wireless device may be one of the wireless devices 214, 216, 218, 220. In this option, the wireless devices 214, 218 of the first device type may use the third RTS type and the second CTS type. The wireless devices 216, 220 of the second device type may use the first RTS type and the first CTS type. Upon receiving the message from the second wireless device, the wireless device 210 may determine a message type of the received message. In an aspect, the wireless device 210 may determine whether the received message is an RTS message, a CTS message, or a data packet. If the message is an RTS message or a CTS message, the wireless device 210 may determine if the message is one of three types of RTS messages or one of three types of CTS message. Based on the determined message type, the wireless device 210 may determine whether the message is associated with an OBSS or a BSS.

In one aspect, the wireless device 210 may determine that the message is an RTS message of the third RTS type (e.g., based on a message type indicated in the message and/or information in the message). The wireless device may determine whether the RTS message is associated with an OBSS or a BSS based on a value of a BSSID field or based on a BSSID in a receiver address (during uplink) or in a transmitter address of the RTS message (during downlink). If the BSSID is associated with the BSS, then the message is an in-BSS RTS message (e.g., from the wireless device 214). If the BSSID is associated with an OBSS, then the message is an OBSS RTS message (e.g., from the wireless device 218). If the message is an in-BSS RTS message, then the wireless device 210 may determine to defer communications. In one aspect, if the message is an OBSS RTS message, then the wireless device 210 may not defer communications. In another aspect, if the message is an OBSS RTS message, the wireless device 210 may consider one or more criteria/factors to determine whether to defer communications. For example, the wireless device 210 may determine an RSSI or SINR of the message. The wireless device 210 may not defer if the received signal strength (e.g., the RSSI or the SINR) of the received message is below a first threshold and the received message is from an OBSS. The wireless device 210 may not defer if the received signal strength is below a RTS threshold and the received message is from an OBSS. The wireless device 210 may not defer if the received signal strength is below a second threshold associated with the wireless device 210. In another aspect, the wireless device 210 may defer if the message indicates that an OBSS device may not transmit on top of the message. In another aspect, the wireless device 210 may determine whether to defer communications when the message is associated with an OBSS based on one or more conditions/criteria included in the message. The conditions may indicate RSSI threshold for ignoring an RTS message, SINR margins needed for the RTS message, MCS of the data transmission, which may be used to determine an amount of tolerable interference, and/or a transmission power of the RTS message.

In another aspect, the wireless device 210 may determine that the message is a CTS message of the second CTS type (e.g., based on a message type indicator in the message and/or information contained in the message). The message may include a BSSID in one or more of the fields within the message. Further, if the message is sent in an uplink transmission, then the message may include a BSSID in a receiver address field. Based on the BSSID, the wireless device 210 may determine whether the message is associated with an OBSS or BSS. Also, the wireless device 210 may determine whether the message is an OBSS CTS message based on whether the message is received a SIFS after an OBSS RTS message. If the message is an in-BSS CTS message (e.g., from the wireless devices 214), then the wireless device 210 may determine to defer communications. In one aspect, if the message is an OBSS CTS message (e.g., from the wireless devices 218), then the wireless device 210 may not defer communications. In another aspect, if the message is an OBSS CTS message, the wireless device 210 may consider one or more criteria/factors to determine whether to defer communications. For example, the wireless device 210 may determine a received signal strength (e.g., an RSSI or SINR) of the message. The wireless device 210 may not defer if the received signal strength of the message is below a first threshold and the received message is from an OBSS. The wireless device 210 may not defer if the received signal strength is below a CTS threshold and the received message is from an OBSS. The wireless device 210 may not defer if the received signal strength is below a second threshold associated with the wireless device 210. In another aspect, the wireless device 210 may defer if the message indicates that an OBSS device may not transmit on top of the message. In another aspect, the wireless device 210 may determine whether to defer communications when the message is associated with an OBSS based on one or more conditions/criteria included in the message. The one or more conditions may indicate RSSI or SINR threshold for ignoring a CTS message, SINR margins needed for the RTS message, MCS of the data transmission, which may be used to determine an amount of tolerable interference, and/or a transmission power of the CTS message.

In another aspect, the wireless device 210 may determine that the message is a data packet (e.g., based on indicators/fields included with the message). The wireless device 210 may determine whether the data packet is associated with an OBSS based on whether the data packet is linked to an OBSS RTS message. For example, if the wireless device 210 receives an OBSS RTS message, then receives an OBSS CTS message after a SIFS, and then receives the data packet after another SIFS, then the wireless device 210 may determine that the data packet is associated with an OBSS. The wireless device 210 may determine whether the data packet is associated with an OBSS based on transmitter and receiver identifiers in the preamble or in the MAC header. There may also be BSS information directly in the preamble or MAC header. In one aspect, if the message is a BSS data packet, then the wireless device may defer communications. In another aspect, if the message is an OBSS data packet, then the wireless device 210 may not defer communications. In this aspect, the wireless device 210 may cancel any network allocation vector set by a corresponding CTS message. In another aspect, if the message is an OBSS data packet, the wireless device 210 may not defer communication only if certain other criteria like RSSI criteria are met. In another aspect, if the message is an OBSS data packet, the wireless device 210 may not defer only if did not defer to the RTS and/or CTS messages (if received) associated with the message.

In an aspect, if the message is of the first RTS type or the first CTS type (e.g., from the wireless device 220), then option 1A describes the behavior of the wireless device 210.

Figure 3:
FIG. 3 is a table illustrating a second exemplary method of RTS/CTS operation.

FIG. 3 is a table 300 illustrating a second exemplary method of RTS/CTS operation. Referring to the table 300, a wireless device 310 may be of a first device type (e.g., an 802.11ax compatible STA or AP). A wireless device 312 may be of a second device type (e.g., not 802.11ax compatible) and in the same BSS as the wireless device 310. The wireless device 310 may have data to transmit. Before transmitting, the wireless device 310 may detect an RTS message, a CTS message, and/or a data packet transmitted by any one of the wireless devices 314, 316, 318, and 320. The wireless device 314 may be of the first device type (e.g., 802.11ax compatible) and the wireless device 316 maybe of the second device type (e.g., not 802.11ax compatible). The wireless devices 314, 316 may be in the same BSS as the wireless device 310. The wireless device 318 may be of the first device type and the wireless device 320 maybe of the second device type. The wireless devices 318, 320 may be in an OBSS with respect to the wireless device 310 and the wireless device 312.

Upon detecting the RTS message, the CTS message, and/or the data packet, the wireless device 310 may determine whether to defer communications based on a communication deferral policy, which may instruct the wireless device 210 to defer communications based on the BSS from which the transmission was sent, the type of device (e.g., the first device type or the second device type), and/or other factors. The communication deferral policy may be the same for an entire network, or the communication deferral policy may be different from one BSS to another BSS. The communication deferral policy may be determined by a serving AP of the BSS. The communication deferral policy may be transmitted to a STA from an AP in a configuration message or preconfigured within the STA and/or the AP.

Table 300 illustrates general guidelines associated with a second communication deferral policy. Under the second communication deferral policy, the wireless device 310 of the first device type needs to be able to distinguish between an OBSS RTS/CTS message and an in-BSS RTS/CTS message. The wireless device 310 also needs to distinguish between the first device type (e.g., an 802.11ax device) and the second device type (e.g., an 802.11a/ac device) because the second communication deferral policy considers device types in determining whether to defer communication. The wireless device 310 may be able to distinguish between the first and second device types based on a device type indicator included in the RTS/CTS messages/data packets. In an aspect, the wireless device 310 may be able to determine that a legacy RTS/CTS message/data packets are legacy based on the contents of the message/data packet. In the second communication deferral policy, the wireless device 310 may defer when the wireless device 310 detects in-BSS RTS/CTS message (e.g., from the wireless device 314 or the wireless device 316), regardless of device type, but need not defer when the wireless device 310 detects an OBSS RTS/CTS message/data packet transmitted by the first device type (e.g., from the wireless device 218). However, the wireless device 310 may defer when the wireless device 310 detects OBSS RTS/CTS messages from the second device type in order to enable better transmission quality (e.g., SINR) for second device types associated with an OBSS. In an aspect, the wireless device 310 may defer when the wireless device detects RTS/CTS messages/data packets from the second device type. With respect to OBSS first device types, the wireless device 310 may nevertheless defer to OBSS RTS/CTS messages/data packets based on characteristics or other information included in the RTS/CTS messages/data packets or based on other factors. Under the second communication deferral policy, the wireless device 310 defers to in-BSS messages to prevent in-BSS collisions. The wireless device 312 continues to defer for in-BSS RTS/CTS messages and OBSS RTS/CTS messages because the wireless device 312 is of the second device type. The wireless device 312, not being able to distinguish between an OBSS message and an in-BSS message or between the first and second device types, may always defer.

Depending on the configuration of RTS/CTS messages used, the wireless device 310 may use different methods to determine whether the message from received from second wireless device is in-BSS or OBSS and of the first device type or the second device type. In an aspect, there may be three types of RTS messages and three types of CTS messages. A first RTS type may include a receiver address field and a transmitter address field, and the receiver address field and/or the transmitter address field may include a BSSID. In an aspect, the first RTS type may be a legacy RTS message (e.g., an IEEE 802.11a/ac RTS message). A second RTS type may include all the aspects of the first RTS type and further include a device type indicator in one or more of the following fields: receiver address field, the transmitter address field, a scrambling seed field, a signal field, a service field, or a frame control field. In an aspect, the second RTS type may be a legacy RTS message that includes a device type indicator (e.g., indicating that the device is an IEEE 802.11ax device). In an aspect, the device type indicator may be the I/G bit in the receiver address field and/or the transmitter address field. A third RTS type may be an IEEE 802.11ax RTS message that includes at least one of a BSS identifier field and a device type indicator. The third RTS type may further include one or more of: an RSSI threshold that enables the wireless device 210 to determine whether non-deferral is allowed, an allowed interference level at the second wireless device or at an intended receiver of the RTS message to determine whether non-deferral is allowed, an MCS of data to be sent or received by the second wireless device, a set of performance requirements, or information about a buffer status associated with multiple traffic identifiers or access classes.

With respect to CTS types, a first CTS type may include a BSSID in a receiver address field if the wireless device 210 is a station, otherwise if the wireless device 210 is an AP, then the receiver address may include the address of a station and not a BSSID. In an aspect, the first CTS type may be a legacy CTS message (e.g., an IEEE 802.11a/ac CTS message). A second CTS type may include the features of the first CTS type and at least one of a BSSID or a device type indicator in the receiver address field, a scrambling seed field, a signal field, a service field, or a frame control field. In an aspect, the second CTS type may be a legacy CTS message that always includes a BSSID and/or a device type indicator in one of the various fields. A third CTS type may be an IEEE 802.11ax CTS message that includes at least one of a BSS identifier field or a device type indicator. The third CTS type may also include an RSSI threshold that enables the wireless device 210 to determine whether non-deferral is allowed, an allow interference level at the second wireless device or at an intended receiver of the message to determine whether non-deferral is allowed, an MCS of data to be transmitted, and a set of performance requirements. Wireless devices of the first device type may use various combinations of the various RTS/CTS types. However, wireless devices of the second device type may use the first RTS type and the first CTS type. Five different configuration options of RTS/CTS messages are described below.

Option 2A: Second RTS Type (and "ax" Bit) & First CTS Type (Optional "ax" Bit)

In option 2A, the first device type (e.g., IEEE 802.11ax product) uses the second RTS type (e.g., an IEEE 802.11a/ac RTS with a device type indicator) and the first CTS type (e.g., an IEEE 802.11a/ac CTS). The second device type (e.g., IEEE 802.11a/ac product) uses the first RTS type and the first CTS type.

In this option, the wireless device 310 may determine the second communication deferral policy within a BSS associated with the wireless device 310. If the wireless device 310 is a STA, the wireless device 310 may receive a configuration message from a serving AP, and the configuration message may include the second communication deferral policy. The wireless device 310 may determine the second communication deferral policy by receiving the second communication deferral policy in the received configuration message. If the wireless device 310 is an AP, the wireless device 310 may determine the second communication deferral policy as further discussed below. In another aspect, the second communication deferral policy may be preconfigured into the wireless device 310.

After determining the second communication deferral policy, the wireless device 310 may receive a message from a second wireless device (e.g., a STA or an AP). The second wireless device may be one of the wireless devices 314, 316, 318, 320. In this option, the wireless devices 314, 318 of the first device type may use the second RTS type and the first CTS type. The wireless devices 316, 320 are of the second device type and may use the first RTS type and the first CTS type. Upon receiving the message from the second wireless device, the wireless device 310 may determine a message type of the received message. In an aspect, the wireless device 310 may determine whether the received message is an RTS message, a CTS message, or a data packet. If the message is an RTS message or a CTS message, the wireless device 310 may determine if the message is one of three types of RTS messages or one of three types of CTS message. Based on the determined message type, the wireless device 310 may determine whether the message is associated with an OBSS or a BSS. The wireless device 310 may also determine whether the second wireless device is a first device type or a second device type based on a device type indicator or other content in the message. In an example, the device type indicator may be set to 1 to indicate that the second wireless device is the first device type or set to 0 to indicate that the second wireless device is the second device type. If the message does not include a device type indicator (e.g., the first RTS type or the first CTS type), the wireless device 310 may determine that the second wireless device is the second device type. The wireless device 310 may determine whether to defer communications based on the whether the message is OBSS or in-BSS, based on whether the second wireless device is of the first device type or the second device type, and based on any other information included in the message.

In one aspect, the wireless device 310 may determine that the message is an RTS message of the second RTS type (e.g., based on a message type indicated in the message and/or information in the message). The wireless device may determine whether the RTS message is associated with an OBSS or a BSS based on a BSSID in a receiver address (during uplink) or in a transmitter address of the RTS message (during downlink). If the BSSID is associated with the BSS, then the message is an in-BSS RTS message. If the BSSID is associated with an OBSS, then the message is an OBSS RTS message. If the message is an in-BSS RTS message (e.g., from the wireless devices 314, 316), then the wireless device 310 may determine to defer communications. In one aspect, if the message is an OBSS RTS message and the second wireless device is the second device type determined based on the device type indicator (e.g., the wireless device 320), then the wireless device 310 may defer communications. In another aspect, if the message is an OBSS RTS message and the second wireless device is the first device type determined based on the device type indicator (e.g., the wireless device 318), then wireless device 310 may not defer communications or may consider one or more criteria/factors to determine whether to defer communications. For example, the wireless device 310 may determine an RSSI or SINR of the message. The wireless device 310 may not defer if the received signal strength (e.g., the RSSI or the SINR) of the received message is below a first threshold, the received message is from an OBSS, and the second wireless device is of the first device type. The wireless device 310 may not defer communications if the received signal strength is below an RTS threshold, the received message is from an OBSS, and the second wireless device is the first device type. The wireless device 310 may not defer if the received signal strength is below a second threshold associated with the wireless device 310 and the message is from an OBSS and the second wireless device is the first device type. In another aspect, the wireless device 310 may defer if the message indicates that an OBSS device may not transmit on top of the message. In another aspect, the wireless device 310 may determine whether to defer communications, when the message is associated with an OBSS and when the second wireless device is of the first device type, based on one or more conditions/criteria included in the message. The conditions may indicate RSSI threshold for ignoring an RTS message, SINR margins needed for the RTS message, MCS of the data transmission, which may be used to determine an amount of tolerable interference, and/or a transmission power of the RTS message.

In another aspect, the wireless device 310 may determine that the message is a CTS message of the first CTS type (e.g., based on a message type indicator in the message and/or information in the message). If the message is sent in an uplink transmission, then the message may include a BSSID in a receiver address field. Based on the BSSID, the wireless device 310 may determine whether the message is associated with an OBSS or BSS. If the message is sent in a downlink transmission, then the wireless device 310 may determine whether the message is an OBSS CTS message based on whether the message is received a SIFS after an OBSS RTS message. In one aspect, if the message is an in-BSS CTS message (e.g., from the wireless devices 314, 316), then the wireless device 310 may determine to defer communications. In another aspect, if the message is an OBSS CTS message and the second wireless device is the second device type determined based on a lack of device type indicator or on the contents of the message (e.g., the wireless device 320), then the wireless device 310 may defer communications. In another aspect, if the message is an OBSS CTS message and the second wireless device is the first device type determined based on the device type indicator (e.g., the wireless device 318), then the wireless device 310 may not defer communications or may consider one or more criteria/factors to determine whether to defer communications. For example, the wireless device 310 may determine a received signal strength (e.g., an RSSI or SINR) of the message. The wireless device 310 may not defer if the received signal strength of the message is below a first threshold, the received message is from an OBSS, and the second wireless device is the first device type. The wireless device 310 may not defer if the received signal strength is below a CTS threshold, the received message is from an OBSS, and the second wireless device is the first device type. The wireless device 310 may not defer if the received signal strength is below a second threshold associated with the wireless device 310, the received message is from an OBSS, and the second wireless device is the first device type. In another aspect, the wireless device 310 may defer communications if the message indicates that an OBSS device may not transmit on top of the message (or on top of a data packet associated with the message). In yet another aspect, if the message is an OBSS message of the first CTS type and the second wireless device is of the second device type, then the wireless device 310 may defer.

In another aspect, the wireless device 310 may determine that the message is a data packet (e.g., based on indicators/fields included with the message). The wireless device 310 may determine whether the data packet is associated with an OBSS based on receive and transmit identifiers in the preamble and/or the MAC header. There may also be BSS information directly in the preamble or MAC header. The wireless device 310 may determine whether the data packet is associated with an OBSS based on whether the data packet is linked to an OBSS RTS message. For example, if the wireless device 310 receives an OBSS RTS message, then receives an OBSS CTS message after a SIFS, and then receives the data packet after another SIFS, then the wireless device 310 may determine that the data packet is associated with an OBSS. The wireless device 310 may further determine if the data packet is transmitted by a first device type or a second device type based on a device type indicator and/or type of preamble. In one aspect, if the message is a BSS data packet, then, regardless of whether the data packet is transmitted by the first or second device type, the wireless device 310 may defer communications. In another aspect, if the message is an OBSS data packet and the OBSS data packet is transmitted by the first device type, then the wireless device 310 may not defer communications. Not deferring may be subject to additional constraints, such as RSSI constraints, or the additional constraints in the corresponding RTS and CTS messages. In this aspect, the wireless device 310 may cancel any network allocation vector set by a corresponding CTS message. However, if the message is an OBSS data packet and the OBSS data packet is transmitted by the second device type, then the wireless device 310 may defer communications. In this aspect, the wireless device 310 may not cancel any network allocation vector set by a corresponding CTS message.

Option 2B: Second RTS Type (and "ax" Bit) and Second CTS Type (with Color/"ax")

In option 2B, the first device type (e.g., IEEE 802.11ax product) uses the second RTS type (e.g., an IEEE 802.11a/ac RTS with a device type indicator) and the second CTS type (e.g., an IEEE 802.11a/ac CTS with a device type indicator and a BSSID).

In this option, the wireless device 310 may determine the second communication deferral policy within a BSS associated with the wireless device 310. If the wireless device 310 is a STA, the wireless device 310 may receive a configuration message from a serving AP, and the configuration message may include the second communication deferral policy. The wireless device 310 may determine the second communication deferral policy by receiving the second communication deferral policy in the received configuration message. If the wireless device 310 is an AP, the wireless device 310 may determine the second communication deferral policy as further discussed below. In another aspect, the second communication deferral policy may be preconfigured into the wireless device 310.

After determining the second communication deferral policy, the wireless device 310 may receive a message from a second wireless device (e.g., a STA or an AP). The second wireless device may be one of the wireless devices 314, 316, 318, 320. In this option, the wireless devices 314, 318 of the first device type may use the second RTS type and the second CTS type. The wireless devices 316, 320 are of the second device type and may use the first RTS type and the first CTS type. Upon receiving the message from the second wireless device, the wireless device 310 may determine a message type of the received message. In an aspect, the wireless device 310 may determine whether the received message is an RTS message, a CTS message, or a data packet. If the message is an RTS message or a CTS message, the wireless device 310 may determine if the message is one of three types of RTS messages or one of three types of CTS message. Based on the determined message type, the wireless device 310 may determine whether the message is associated with an OBSS or a BSS. The wireless device 310 may also determine whether the second wireless device is a first device type or a second device type based on a device type indicator in the message. For example, the device type indicator may be set to 1 to indicate that the second wireless device is the first device type or set to 0 to indicate that the second wireless device is the second device type. If the message does not include a device type indicator (e.g., the first RTS type or the first CTS type), the wireless device 310 may determine that the second wireless device is the second device type. The wireless device 310 may determine whether to defer communications based on the whether the message is OBSS or in-BSS, based on whether the second wireless device is of the first device type or the second device type, and based on any other information included in the message.

In one aspect, the wireless device 310 may determine that the message is an RTS message of the second RTS type (e.g., based on a message type indicated in the message and/or information in the message). The wireless device may determine whether the RTS message is associated with an OBSS or a BSS based on a BSSID in a receiver address (during uplink) or in a transmitter address of the RTS message (during downlink). If the BSSID is associated with the BSS, then the message is an in-BSS RTS message. If the BSSID is associated with an OBSS, then the message is an OBSS RTS message. If the message is an in-BSS RTS message (e.g., from the wireless devices 314, 316), then the wireless device 310 may determine to defer communications. In one aspect, if the message is an OBSS RTS message and the second wireless device is the second device type determined based on the device type indicator (e.g., the wireless device 320), then the wireless device 310 may defer communications. In another aspect, if the message is an OBSS RTS message and the second wireless device is the first device type determined based on the device type indicator (e.g., the wireless device 318), then wireless device 310 may not defer communications or may consider one or more criteria/factors to determine whether to defer communications. For example, the wireless device 310 may determine an RSSI or SINR of the message. The wireless device 310 may not defer if the received signal strength (e.g., the RSSI or the SINR) of the received message is below a first threshold, the received message is from an OBSS, and the second wireless device is of the first device type. The wireless device 310 may not defer communications if the received signal strength is below an RTS threshold, the received message is from an OBSS, and the second wireless device is the first device type. The wireless device 310 may not defer if the received signal strength is below a second threshold associated with the wireless device 310, the received message is from an OBSS, and the second wireless device is of the first type. In another aspect, the wireless device 310 may defer if the message indicates that an OBSS device may not transmit on top of the message. In another aspect, the wireless device 310 may determine whether to defer communications, when the message is associated with an OBSS and when the second wireless device is of the first device type, based on one or more conditions/criteria included in the message. The conditions may indicate RSSI threshold for ignoring an RTS message, SINR margins needed for the RTS message, MCS of the data transmission, which may be used to determine an amount of tolerable interference, and/or a transmission power of the RTS message.

In another aspect, the wireless device 310 may determine that the message is a CTS message of the second CTS type (e.g., based on a message type indicator in the message and/or information in the message). The message may include a BSSID in one or more of the fields within the message. Further, if the message is sent in an uplink transmission, then the message may include a BSSID in a receiver address field. Based on the BSSID, the wireless device 310 may determine whether the message is associated with an OBSS or BSS. Also, if the message is sent in a downlink transmission, then the wireless device 310 may determine whether the message is an OBSS CTS message based on whether the message is received a SIFS after an OBSS RTS message. In one aspect, if the message is an in-BSS CTS message (e.g., from the wireless devices 314, 316), then the wireless device 310 may determine to defer communications. In another aspect, if the message is an OBSS CTS message and the second wireless device is the second device type determined based on the device type indicator (e.g., the wireless device 320), then the wireless device 310 may defer communications. In another aspect, if the message is an OBSS CTS message and the second wireless device is the first device type determined based on the device type indicator (e.g., the wireless device 318), then the wireless device 310 may not defer communications or may consider one or more criteria/factors to determine whether to defer communications. For example, the wireless device 310 may determine a received signal strength (e.g., an RSSI or SINR) of the message. The wireless device 310 may not defer if the received signal strength of the message is below a first threshold, the received message is from an OBSS, and the second wireless device is the first device type. The wireless device 310 may not defer if the received signal strength is below a CTS threshold, the received message is from an OBSS, and the second wireless device is the first device type. The wireless device 310 may not defer if the received signal strength is below a second threshold associated with the wireless device 310. In another aspect, the wireless device 310 may defer communications if the message indicates that an OBSS device may not transmit on top of the message (or on top of a data packet associated with the message). In another aspect, the wireless device 310 may determine whether to defer communications, when the message is associated with an OBSS and when the second wireless device is the first device type, based on one or more conditions/criteria included in the message. The one or more conditions may indicate RSSI or SINR threshold for ignoring a CTS message, SINR margins needed for the ensuing data packet, MCS of the data transmission, which may be used to determine an amount of tolerable interference, and/or a transmission power of the CTS message. In another aspect, if the message is an OBSS message of the first CTS type and the second wireless device is the first device type, then the wireless device 310 may defer. In yet another aspect, if the message is an OBSS message of the first CTS type and the second wireless device is of the second device type, then the wireless device 310 may defer.

In another aspect, the wireless device 310 may determine that the message is a data packet (e.g., based on indicators/fields included with the message). The wireless device 310 may determine that the data packet is from an OBSS based on receiver and transmitter indicators in the preamble and/or in the MAC header. There may also be BSS information directly in the preamble or MAC header. The wireless device 310 may determine whether the data packet is associated with an OBSS based on whether the data packet is linked to an OBSS RTS message. For example, if the wireless device 310 receives an OBSS RTS message, then receives an OBSS CTS message after a SIFS, and then receives the data packet after another SIFS, then the wireless device 310 may determine that the data packet is associated with an OBSS. The wireless device 310 may further determine if the data packet is transmitted by a first device type or a second device type based on a device type indicator. In one aspect, if the message is a BSS data packet, then, regardless of whether the data packet is transmitted by the first or second device type, the wireless device 310 may defer communications. In another aspect, if the message is an OBSS data packet and the OBSS data packet is transmitted by the first device type, then the wireless device 310 may not defer communications. In this aspect, the wireless device 310 may cancel any network allocation vector set by a corresponding CTS message. However, if the message is an OBSS data packet and the OBSS data packet is transmitted by the second device type, then the wireless device 310 may defer communications. In this aspect, the wireless device 310 may not cancel any network allocation vector set by a corresponding CTS message. In another aspect, if the message is an OBSS data packet and is transmitted by a first device type, then the wireless device 310 may not defer based on additional requirements such as RSSI requirements, or any requirements given in the associated RTS and/or CTS messages.

Option 2C: Second RTS Type (and "ax") and Third CTS Type with Color and NAV

In option 2C, the first device type (e.g., IEEE 802.11ax product) uses the second RTS type (e.g., an IEEE 802.11a/ac RTS with a device type indicator) and the third CTS type (e.g., an IEEE 802.11ax CTS). In this option, the third CTS type may include a BSSID field (or color information field). The third CTS type may include a network allocation vector that is compatible with the second device type (e.g., an IEEE 802.11a/ac device).

In this option, the wireless device 310 may determine the second communication deferral policy within a BSS associated with the wireless device 310. If the wireless device 310 is a STA, the wireless device 310 may receive a configuration message from a serving AP, and the configuration message may include the second communication deferral policy. The wireless device 310 may determine the second communication deferral policy by receiving the second communication deferral policy in the received configuration message. If the wireless device 310 is an AP, the wireless device 310 may determine the second communication deferral policy as further discussed below. In another aspect, the second communication deferral policy may be preconfigured into the wireless device 310.

After determining the second communication deferral policy, the wireless device 310 may receive a message from a second wireless device (e.g., a STA or an AP). The second wireless device may be one of the wireless devices 314, 316, 318, 320. In this option, the wireless devices 314, 318 of the first device type may use the second RTS type and the third CTS type. The wireless devices 316, 320 are of the second device type and may use the first RTS type and the first CTS type. Upon receiving the message from the second wireless device, the wireless device 310 may determine a message type of the received message. In an aspect, the wireless device 310 may determine whether the received message is an RTS message, a CTS message, or a data packet. If the message is an RTS message or a CTS message, the wireless device 310 may determine if the message is one of three types of RTS messages or one of three types of CTS message. Based on the determined message type, the wireless device 310 may determine whether the message is associated with an OBSS or a BSS. The wireless device 310 may also determine whether the second wireless device is a first device type or a second device type based on a device type indicator in the message. For example, the device type indicator may be set to 1 to indicate that the second wireless device is the first device type or set to 0 to indicate that the second wireless device is the second device type. If the message does not include a device type indicator (e.g., the first RTS type or the first CTS type), the wireless device 310 may determine that the second wireless device is the second device type. The wireless device 310 may determine whether to defer communications based on the whether the message is OBSS or in-BSS, based on whether the second wireless device is of the first device type or the second device type, and based on any other information included in the message.

In one aspect, the wireless device 310 may determine that the message is an RTS message of the second RTS type (e.g., based on a message type indicated in the message and/or information in the message). The wireless device may determine whether the RTS message is associated with an OBSS or a BSS based on a BSSID in a receiver address (during uplink) or in a transmitter address of the RTS message (during downlink). If the BSSID is associated with the BSS, then the message is an in-BSS RTS message. If the BSSID is associated with an OBSS, then the message is an OBSS RTS message. If the message is an in-BSS RTS message (e.g., from the wireless devices 314, 316), then the wireless device 310 may determine to defer communications. In one aspect, if the message is an OBSS RTS message and the second wireless device is the second device type determined based on the device type indicator (e.g., the wireless device 320), then the wireless device 310 may defer communications. In another aspect, if the message is an OBSS RTS message and the second wireless device is the first device type determined based on the device type indicator (e.g., the wireless device 318), then wireless device 310 may not defer communications or may consider one or more criteria/factors to determine whether to defer communications. For example, the wireless device 310 may determine an RSSI or SINR of the message. The wireless device 310 may not defer if the received signal strength (e.g., the RSSI or the SINR) of the received message is below a first threshold, the received message is from an OBSS, and the second wireless device is of the first device type. The wireless device 310 may not defer communications if the received signal strength is below an RTS threshold, the received message is from an OBSS, and the second wireless device is the first device type. The wireless device 310 may not defer if the received signal strength is below a second threshold associated with the wireless device 310, the received message is from an OBSS, and the second wireless device is of the first device type. In another aspect, the wireless device 310 may defer if the message indicates that an OBSS device may not transmit on top of the message. In another aspect, the wireless device 310 may determine whether to defer communications, when the message is associated with an OBSS and when the second wireless device is of the first device type, based on one or more conditions/criteria included in the message. The conditions may indicate RSSI threshold for ignoring an RTS message, SINR margins needed for the RTS message, MCS of the data transmission, which may be used to determine an amount of tolerable interference, and/or a transmission power of the RTS message.

In another aspect, the wireless device 310 may determine that the message is a CTS message of the third CTS type (e.g., based on a message type indicator in the message and/or information in the message such as a preamble). If the message is sent in an uplink transmission, then the message may include a BSSID in a receiver address field. And in both uplink and downlink transmission of the message, the wireless device 310 may determine a BSSID based on a value in a BSSID field (or color information field), or a transmitter address field, included in the message. Based on the BSSID, the wireless device 310 may determine whether the message is associated with an OBSS or BSS. If the message is an in-BSS CTS message, then the wireless device 310 may determine to defer communications. In one aspect, if the message is an OBSS CTS message and the second wireless device is the second device type, then the wireless device 310 may defer communications. In another aspect, if the message is an OBSS CTS message and the second wireless device is the first device type, then the wireless device 310 may not defer communications or may consider one or more criteria/factors to determine whether to defer communications. For example, the wireless device 310 may determine a received signal strength (e.g., an RSSI or SINR) of the message. The wireless device 310 may not defer if the received signal strength of the message is below a first threshold, the received message is from an OBSS, and the second wireless device is the first device type. The wireless device 310 may not defer if the received signal strength is below a CTS threshold, the received message is from an OBSS, and the second wireless device is the first device type. The wireless device 310 may not defer if the received signal strength is below a second threshold associated with the wireless device 310, the received message is from an OBSS, and the second wireless device is of the first device type. In another aspect, the wireless device 310 may defer communications if the message indicates that an OBSS device may not transmit on top of the message (or on top of a data packet associated with the message). In another aspect, the wireless device 310 may determine whether to defer communications, when the message is associated with an OBSS and when the second wireless device is the first device type, based on one or more conditions/criteria included in the message. The one or more conditions may indicate RSSI or SINR threshold for ignoring a CTS message, SINR margins needed for the RTS message, MCS of the data transmission, which may be used to determine an amount of tolerable interference, and/or a transmission power of the CTS message.

In another aspect, the wireless device 310 may determine that the message is a data packet (e.g., based on indicators/fields included with the message). The wireless device 310 may determine whether the data packet is associated with an OBSS based on the receiver and transmitter identifiers in the preamble and/or MAC header. There may also be BSS information directly in the preamble or MAC header. The wireless device 310 may determine whether the data packet is associated with an OBSS based on whether the data packet is linked to an OBSS RTS message or a CTS message. For example, if the wireless device 310 receives an OBSS RTS message, then receives an OBSS CTS message after a SIFS, and then receives the data packet after another SIFS, then the wireless device 310 may determine that the data packet is associated with an OBSS. The wireless device 310 may further determine if the data packet is transmitted by a first device type or a second device type based on a device type indicator. In one aspect, if the message is a BSS data packet, then, regardless of whether the data packet is transmitted by the first or second device type, the wireless device 310 may defer communications. In another aspect, if the message is an OBSS data packet and the OBSS data packet is transmitted by the first device type, then the wireless device 310 may not defer communications, or may not defer communications if certain requirements, such as RSSI requirements, are met. Other requirements may be contained the associated RTS/CTS message. If the message is an OBSS data packet and the OBSS data packet is transmitted by the second device type, then the wireless device 310 may defer communications.

Option 2D: Third RTS Type with Color/NAV and Third CTS Type with Color/NAV

In option 2D, the first device type (e.g., IEEE 802.11ax product) uses the third RTS type (e.g., an IEEE 802.11ax RTS) and the third CTS type (e.g., an IEEE 802.11ax CTS). In this option, both the third RTS type and the third CTS type may include a BSSID field (or color information field). The third RTS and CTS type may include a network allocation vector that is compatible with the second device type (e.g., an IEEE 802.11a/ac device). Also, the third RTS and CTS type may include a device type indicator.

In this option, the wireless device 310 may determine the second communication deferral policy within a BSS associated with the wireless device 310. If the wireless device 310 is a STA, the wireless device 310 may receive a configuration message from a serving AP, and the configuration message may include the second communication deferral policy. The wireless device 310 may determine the second communication deferral policy by receiving the second communication deferral policy in the received configuration message. If the wireless device 310 is an AP, the wireless device 310 may determine the second communication deferral policy as further discussed below. In another aspect, the second communication deferral policy may be preconfigured into the wireless device 310.

After determining the second communication deferral policy, the wireless device 310 may receive a message from a second wireless device (e.g., a STA or an AP). The second wireless device may be one of the wireless devices 314, 316, 318, 320. In this option, the wireless devices 314, 318 of the first device type may use the third RTS type and the third CTS type. The wireless devices 316, 320 are of the second device type and may use the first RTS type and the first CTS type. Upon receiving the message from the second wireless device, the wireless device 310 may determine a message type of the received message. In an aspect, the wireless device 310 may determine whether the received message is an RTS message, a CTS message, or a data packet. If the message is an RTS message or a CTS message, the wireless device 310 may determine if the message is one of three types of RTS messages or one of three types of CTS message. Based on the determined message type, the wireless device 310 may determine whether the message is associated with an OBSS or a BSS. The wireless device 310 may also determine whether the second wireless device is a first device type or a second device type based on a device type indicator in the message. For example, the device type indicator may be set to 1 to indicate that the second wireless device is the first device type or set to 0 to indicate that the second wireless device is the second device type. If the message does not include a device type indicator (e.g., the first RTS type or the first CTS type), the wireless device 310 may determine that the second wireless device is the second device type. The wireless device 310 may determine whether to defer communications based on the whether the message is OBSS or in-BSS, based on whether the second wireless device is of the first device type or the second device type, and based on any other information included in the message.

In one aspect, the wireless device 310 may determine that the message is an RTS message of the third RTS type (e.g., based on a message type indicated in the message and/or information in the message such as a preamble). The wireless device may determine whether the RTS message is associated with an OBSS or a BSS based on a value of a BSSID field or based on a BSSID in a receiver address (during uplink) or in a transmitter address of the RTS message (during downlink). If the BSSID is associated with the BSS, then the message is an in-BSS RTS message. If the BSSID is associated with an OBSS, then the message is an OBSS RTS message. If the message is an in-BSS RTS message (e.g., from the wireless devices 314, 136), then the wireless device 310 may determine to defer communications. In one aspect, if the message is an OBSS RTS message and the second wireless device is the second device type (e.g., the wireless device 320), then the wireless device 310 may defer communications. In another aspect, if the message is an OBSS RTS message and the second wireless device is the first device type (e.g., the wireless device 318), then wireless device 310 may not defer communications or may consider one or more criteria/factors to determine whether to defer communications. For example, the wireless device 310 may determine an RSSI or SINR of the message. The wireless device 310 may not defer if the received signal strength (e.g., the RSSI or the SINR) of the received message is below a first threshold, the received message is from an OBSS, and the second wireless device is of the first device type. The wireless device 310 may not defer communications if the received signal strength is below a RTS threshold, the received message is from an OBSS, and the second wireless device is the first device type. The wireless device 310 may not defer if the received signal strength is below a second threshold associated with the wireless device 310, the received message is from an OBSS, and the second wireless device is a first device type. In another aspect, the wireless device 310 may defer if the message indicates that an OBSS device may not transmit on top of the message. In another aspect, the wireless device 310 may determine whether to defer communications, when the message is associated with an OBSS and when the second wireless device is of the first device type, based on one or more conditions/criteria included in the message. The conditions may indicate RSSI threshold for ignoring an RTS message, SINR margins needed for the ensuing data packet, MCS of the data transmission, which may be used to determine an amount of tolerable interference, and/or a transmission power of the RTS message.

In another aspect, the wireless device 310 may determine that the message is a CTS message of the third CTS type (e.g., based on a message type indicator in the message and/or information in the message such as a preamble). If the message is sent in an uplink transmission, then the message may include a BSSID in a receiver address field. And in both uplink and downlink transmission of the message, the wireless device 310 may determine a BSSID based on a value in a BSSID field (or color information field), or a transmitter or receiver address field, included in the message. Based on the BSSID, the wireless device 310 may determine whether the message is associated with an OBSS or BSS. If the message is an in-BSS CTS message, then the wireless device 310 may determine to defer communications. In one aspect, if the message is an OBSS CTS message and the second wireless device is the second device type, then the wireless device 310 may defer communications. In another aspect, if the message is an OBSS CTS message and the second wireless device is the first device type, then the wireless device 310 may not defer communications or may consider one or more criteria/factors to determine whether to defer communications. For example, the wireless device 310 may determine a received signal strength (e.g., an RSSI or SINR) of the message. The wireless device 310 may not defer if the received signal strength of the message is below a first threshold, the received message is from an OBSS, and the second wireless device is the first device type. The wireless device 310 may not defer if the received signal strength is below a CTS threshold, the received message is from an OBSS, and the second wireless device is the first device type. The wireless device 310 may not defer if the received signal strength is below a second threshold associated with the wireless device 310, the received message is from an OBSS, and the second wireless device is the first device type. In another aspect, the wireless device 310 may defer communications if the message indicates that an OBSS device may not transmit on top of the message (or on top of a data packet associated with the message). In another aspect, the wireless device 310 may determine whether to defer communications, when the message is associated with an OBSS and when the second wireless device is the first device type, based on one or more conditions/criteria included in the message. The one or more conditions may indicate RSSI or SINR threshold for ignoring a CTS message, SINR margins needed for the RTS message, MCS of the data transmission, which may be used to determine an amount of tolerable interference, and/or a transmission power of the CTS message.

In another aspect, the wireless device 310 may determine that the message is a data packet (e.g., based on indicators/fields included with the message). The wireless device 310 may determine whether the data packet is associated with an OBSS based on the receive and transmit identifiers in the preamble and or MAC header. There may also be BSS information directly in the preamble or MAC header. The wireless device 310 may determine whether the data packet is associated with an OBSS based on whether the data packet is linked to an OBSS RTS or CTS message. For example, if the wireless device 310 receives an OBSS RTS message, then receives an OBSS CTS message after a SIFS, and then receives the data packet after another SIFS, then the wireless device 310 may determine that the data packet is associated with an OBSS. The wireless device 310 may further determine if the data packet is transmitted by a first device type or a second device type based on a device type indicator. In one aspect, if the message is a BSS data packet, then, regardless of whether the data packet is transmitted by the first or second device type, the wireless device 310 may defer communications. In another aspect, if the message is an OBSS data packet and the OBSS data packet is transmitted by the first device type, then the wireless device 310 may not defer communications. In another aspect, the decision to not defer may be made only if additional criteria are met. For example if the RSSI is below a certain level or if the requirements for non-deferral found in the associated RTS and/or CTS messages are met. However, if the message is an OBSS data packet and the OBSS data packet is transmitted by the second device type, then the wireless device 310 may defer communications.

Option 2E: Third RTS Type and Second CTS Type

In option 2E, the first device type (e.g., IEEE 802.11ax product) uses the third RTS type (e.g., an IEEE 802.11ax RTS) and the second CTS type (e.g., an IEEE 802.11a/ac CTS with color information and a device type indicator).

In this option, the wireless device 310 may determine the second communication deferral policy within a BSS associated with the wireless device 310. If the wireless device 310 is a STA, the wireless device 310 may receive a configuration message from a serving AP, and the configuration message may include the second communication deferral policy. The wireless device 310 may determine the second communication deferral policy by receiving the second communication deferral policy in the received configuration message. If the wireless device 310 is an AP, the wireless device 310 may determine the second communication deferral policy as further discussed below. In another aspect, the second communication deferral policy may be preconfigured into the wireless device 310.

After determining the second communication deferral policy, the wireless device 310 may receive a message from a second wireless device (e.g., a STA or an AP). The second wireless device may be one of the wireless devices 314, 316, 318, 320. In this option, the wireless devices 314, 318 of the first device type may use the third RTS type and the second CTS type. The wireless devices 316, 320 are of the second device type and may use the first RTS type and the first CTS type. Upon receiving the message from the second wireless device, the wireless device 310 may determine a message type of the received message. In an aspect, the wireless device 310 may determine whether the received message is an RTS message, a CTS message, or a data packet. If the message is an RTS message or a CTS message, the wireless device 310 may determine if the message is one of three types of RTS messages or one of three types of CTS message. Based on the determined message type, the wireless device 310 may determine whether the message is associated with an OBSS or a BSS. The wireless device 310 may also determine whether the second wireless device is a first device type or a second device type based on a device type indicator in the message. For example, the device type indicator may be set to 1 to indicate that the second wireless device is the first device type or set to 0 to indicate that the second wireless device is the second device type. If the message does not include a device type indicator (e.g., the first RTS type or the first CTS type), the wireless device 310 may determine that the second wireless device is the second device type. The wireless device 310 may determine whether to defer communications based on the whether the message is OBSS or in-BSS, based on whether the second wireless device is of the first device type or the second device type, and based on any other information included in the message.

In one aspect, the wireless device 310 may determine that the message is an RTS message of the third RTS type (e.g., based on a message type indicated in the message and/or information in the message such as a preamble). The wireless device may determine whether the RTS message is associated with an OBSS or a BSS based on a value of a BSSID field or based on a BSSID in a receiver address (during uplink) or in a transmitter address of the RTS message (during downlink). If the BSSID is associated with the BSS, then the message is an in-BSS RTS message. If the BSSID is associated with an OBSS, then the message is an OBSS RTS message. If the message is an in-BSS RTS message (e.g., from the wireless devices 314, 136), then the wireless device 310 may determine to defer communications. In one aspect, if the message is an OBSS RTS message and the second wireless device is the second device type (e.g., the wireless device 320), then the wireless device 310 may defer communications. In another aspect, if the message is an OBSS RTS message and the second wireless device is the first device type (e.g., the wireless device 318), then wireless device 310 may not defer communications or may consider one or more criteria/factors to determine whether to defer communications. For example, the wireless device 310 may determine an RSSI or SINR of the message. The wireless device 310 may not defer if the received signal strength (e.g., the RSSI or the SINR) of the received message is below a first threshold, the received message is from an OBSS, and the second wireless device is of the first device type. The wireless device 310 may not defer communications if the received signal strength is below a RTS threshold, the received message is from an OBSS, and the second wireless device is the first device type. The wireless device 310 may not defer if the received signal strength is below a second threshold associated with the wireless device 310. In another aspect, the wireless device 310 may defer if the message indicates that an OBSS device may not transmit on top of the message. In another aspect, the wireless device 310 may determine whether to defer communications, when the message is associated with an OBSS and when the second wireless device is of the first device type, based on one or more conditions/criteria included in the message. The conditions may indicate RSSI threshold for ignoring an RTS message, SINR margins needed for the ensuing data packet, MCS of the data transmission, which may be used to determine an amount of tolerable interference, and/or a transmission power of the RTS message.

In another aspect, the wireless device 310 may determine that the message is a CTS message of the second CTS type (e.g., based on a message type indicator in the message and/or information in the message). The message may include a BSSID in one or more of the fields within the message. Further, if the message is sent in an uplink transmission, then the message may include a BSSID in a receiver address field. Based on the BSSID, the wireless device 310 may determine whether the message is associated with an OBSS or BSS. Also, if the message is sent in a downlink transmission, then the wireless device 310 may determine whether the message is an OBSS CTS message based on whether the message is received a SIFS after an OBSS RTS message. In one aspect, if the message is an in-BSS CTS message (e.g., from the wireless devices 314, 316), then the wireless device 310 may determine to defer communications. In another aspect, if the message is an OBSS CTS message and the second wireless device is the second device type determined based on the device type indicator (e.g., the wireless device 320), then the wireless device 310 may defer communications. In another aspect, if the message is an OBSS CTS message and the second wireless device is the first device type determined based on the device type indicator (e.g., the wireless device 318), then the wireless device 310 may not defer communications or may consider one or more criteria/factors to determine whether to defer communications. For example, the wireless device 310 may determine a received signal strength (e.g., an RSSI or SINR) of the message. The wireless device 310 may not defer if the received signal strength of the message is below a first threshold, the received message is from an OBSS, and the second wireless device is the first device type. The wireless device 310 may not defer if the received signal strength is below a CTS threshold, the received message is from an OBSS, and the second wireless device is the first device type. The wireless device 310 may not defer if the received signal strength is below a second threshold associated with the wireless device 310. In another aspect, the wireless device 310 may defer communications if the message indicates that an OBSS device may not transmit on top of the message (or on top of a data packet associated with the message). In another aspect, the wireless device 310 may determine whether to defer communications, when the message is associated with an OBSS and when the second wireless device is the first device type, based on one or more conditions/criteria included in the message. The one or more conditions may indicate RSSI or SINR threshold for ignoring a CTS message, SINR margins needed for the ensuing data packet, MCS of the data transmission, which may be used to determine an amount of tolerable interference, and/or a transmission power of the CTS message. In another aspect, if the message is an OBSS message of the first CTS type and the second wireless device is the first device type, then the wireless device 310 may defer, or may not defer based on the aforementioned conditions as with the second CTS type. In yet another aspect, if the message is an OBSS message of the first CTS type and the second wireless device is of the second device type, then the wireless device 310 may defer.

In another aspect, the wireless device 310 may determine that the message is a data packet (e.g., based on indicators/fields included with the message). The wireless device 310 may determine that the message is associated with an OBSS based on transmit and receive identifiers in the preamble and/or MAC header. There may also be BSS information directly in the preamble or MAC header. The wireless device 310 may also determine whether the data packet is associated with an OBSS based on whether the data packet is linked to an OBSS RTS message. For example, if the wireless device 310 receives an OBSS RTS message, then receives an OBSS CTS message after a SIFS, and then receives the data packet after another SIFS, then the wireless device 310 may determine that the data packet is associated with an OBSS. The wireless device 310 may further determine if the data packet is transmitted by a first device type or a second device type based on a device type indicator. In one aspect, if the message is a BSS data packet, then, regardless of whether the data packet is transmitted by the first or second device type, the wireless device 310 may defer communications. In another aspect, if the message is an OBSS data packet and the OBSS data packet is transmitted by the first device type, then the wireless device 310 may not defer communications. In one aspect, the decision to not defer may be made only if additional conditions are met. These may be conditions on the RSSI, or conditions contained in the associated RTS/CTS message. In this aspect, the wireless device 310 may cancel any network allocation vector set by a corresponding CTS message. However, if the message is an OBSS data packet and the OBSS data packet is transmitted by the second device type, then the wireless device 310 may defer communications. In this aspect, the wireless device 310 may not cancel any network allocation vector set by a corresponding CTS message.

FIG. 4 is a table 400 illustrating a third exemplary method of RTS/CTS operation. Referring to the table 400, a wireless device 410 may be of a first device type (e.g., an 802.11ax compatible STA or AP). A wireless device 412 may be of a second device type (e.g., not 802.11ax compatible) and in the same BSS as the wireless device 410. The wireless device 410 may have data to transmit. Before transmitting, the wireless device 410 may detect an RTS message, a CTS message, and/or a data packet transmitted by a second wireless device, which may be any one of the wireless devices 414, 416, 418, and 420. The wireless device 414 may be of the first device type (e.g., 802.11ax compatible) and the wireless device 416 maybe of the second device type (e.g., not 802.11ax compatible). The wireless devices 414, 416 may be in the same BSS as the wireless device 410. The wireless device 418 may be of the first device type and the wireless device 420 maybe of the second device type. The wireless devices 418, 420 may be in an OBSS with respect to the wireless device 410 and the wireless device 412.

Upon detecting the RTS message, the CTS message, and/or the data packet from the second wireless device, the wireless devices 410, 412 may determine whether to defer communications. Table 400 illustrates general guidelines associated with a third communication deferral policy. Under the third communication deferral policy, the wireless device 410 behaves in the same way as the wireless device 310, as discussed above. The wireless device 412, however, defers for in-BSS RTS/CTS messages associated with any device type and OBSS RTS/CTS messages associated with a second device type but, unlike the wireless devices 212, 312, does not defer for OBSS RTS/CTS messages of the first device type. The goal of the third communication deferral policy is to not over silence OBSS wireless devices of the second device type.

However, because the wireless device 412 is of the second device type, the wireless device 412 may have a preconfigured communication deferral policy that may not be modified by signaling from a serving AP. Nevertheless, different methods exist to change the behavior of the wireless device 412 to allow the wireless device 412 to not defer to OBSS messages from the wireless device 418. In one aspect, the third RTS type and the third CTS type may not be decodable by the wireless device 412. In another aspect, the serving AP may use a quiet interval to silence the wireless device 412 and a quiet element cancellation only decodable by the first device type so that wireless device 412 and wireless device 410 are not contending for the medium at the same time. In this way, devices of the first and second device types within the BSS are forced to defer to each other, and devices of the first device type may use RTS and CTS messages of the third type which cannot be understood by devices of the second device type. This allows devices of the second device type to not defer to the RTS and CTS messages sent by OBSS devices of the first device type. In another aspect, wireless devices of the first device type may limit the power and/or rate of the any RTS/CTS types that are decodable by the first device type so that the silencing area is minimal. In another aspect, the first device type may reduce the RTS network allocation vector (e.g., only to cover CTS) or, if using an RTS of the third type, make the RTS network allocation vector not decodable by the second device type (e.g., not decodable by legacy devices such as 802.11a/ac products). In yet another aspect, the first device types may have less favorable enhanced distributed channel access (EDCA) parameters compared to the second device types.

RTS/CTS Message Signaling

As discussed above, a device type indicator may be used to indicate a device type that is transmitting the RTS/CTS message/data packet. In one configuration of the second RTS type, the device type indicator may be in the individual/group (I/G) bit of a transmitter address field or the receiver address field. The I/G bit indicates if the address is individual (unicast) or group (multicast). In an aspect, if the device type indicator is set to 1, then the device type is the first device type. If the device type indicator is set to 0, then the device type is the second device type. In another configuration of the second RTS type, the device type indicator may be implemented by replacing other bits in a transmitter address field or receiver address field with a special string to indicate the first device type. In another configuration of the second RTS type, the device type indicator may be located in a scrambling seed. In this configuration, the I/G bit may be used to indicate hidden information in the scrambling seed. In another configuration of the second RTS type, the device type indicator may be implemented in a reserved bit in a signal field. In another configuration of the second RTS type, the device type indicator may be implemented in a reserved bit in a service field. In another configuration of the second RTS type, the device type indicator may be implemented in a frame control field. In this configuration, various bits originally set as 0 (e.g., retry, more fragmentation, protected frame bits) may be set to 1 to indicate the device type. In yet another configuration, multiple bits from multiple fields may be used to implement the device type indicator. For example, the I/G bit in the transmitter address field or the I/G bit in the receiver address field and one or more bits in the scrambling seed may be set to 1 to indicate a first device type in the second RTS type. In another example, the I/G/bit in the transmitter address field or the I/G bit in the receiver address field and one or more bits in the transmitter address field or the receiver address field may be used to implement the device type indicator.

Similar methods may be used to implement a device type indicator and to include BSSID information in a CTS message of the second CTS type (except that a transmitter address field may not be used because the CTS message may not have a transmitter address field). For example, the device type indicator and/or the BSSID information may be included in a receiver address field, a scrambling seed, reserved bits in the signal or service field, or a frame control field bits originally set as a fixed value. Examples of frame control field bits may include retry, more fragmentation, and protected frame bits. Non-zero combinations of bits may be used to indicate a BSSID. In another configuration, the receiver address field may include the BSSID, and the left over bits in the receiver address and/or other bits in the CTS message may be used to identify the receiver. For example, an AP may select the same scrambling seed in the CTS message as that in the RTS message to identify the wireless device intended recipient of the CTS message. Alternatively, instead of putting a receiver address for a wireless device in the receiver address field, the receiver address may be put into a different field. In another aspect, the AP may use other reserved bits to identify the wireless device by using a hashed version of the medium access control (MAC) identifier of the wireless device. In another aspect, the receiver address field or any other field in a CTS message of the second CTS type may be modified to at partially carry a MAC address of the node to be responded (e.g., the original receiver address). In this aspect, the receiver address may be compressed into a smaller number of bits. The receiver address field or any other field in the CTS message of the second CTS type may also be modified to carry a device type indicator (e.g., a special bit string) or information associated with a BSS identifier (e.g., color bits or a compressed BSSID with a smaller number of bits). Various fields in the CTS message of the second CTS type may also include at least part of one or more of the following: transmitter address, receiver address, BSS ID, network allocation vector, device type indicator, color bits, a selected MCS, an amount of buffered data (total data, data per access category, and/or per session), required resources (e.g., TXOP, bandwidth), RSSI levels required for non-deferral, requested interference levels for reusing wireless devices to adhere to, and/or any performance related metrics (e.g., PER, latency, throughput (total, per access category, and/or per session)).

Instead of utilizing RTS/CTS messages of the second RTS type and of the second CTS type, RTS/CTS message of the third RTS type and the third CTS type may be used. The third RTS/CTS types may represent new RTS/CTS types that are compatible with IEEE 802.11ax standards. Multiple options exist for defining the third RTS type and the third CTS type.

With respect to the third RTS type, one configuration is to base the third RTS type on a control frame format but add additional fields such as a transmitter address field, a receiver address field, a network allocation vector, and a color field to indicate the BSS information. In this configuration, one unused extended control frame subtype may be used to indicate that the frame is a third RTS type compatible with the IEEE 802.11ax standard. In another configuration, the third RTS type may be based on a management frame format. In this configuration, the MAC header may include a transmitter address field, a receiver address field, a network allocation vector, and a BSSID field. In this configuration, one unused reserved management frame subtype may be used to indicate the frame is a colored RTS frame. In another configuration, the third RTS type may be based on a null data frame format. In this configuration, the MAC header may include a transmitter address field, a receiver address field, and a network allocation vector. Color and colored RTS indication may reuse an address 3 field, an address 4 field, and/or sequence control fields. For example, the address 3 field may be set as a reserved MAC address to indicate the frame is a colored RTS, while sequence control field carries the color. The RTS of the third RTS type may be sent with any physical layer preamble compatible with the IEEE 802.11 standard, including 802.11a or 802.11ac.

Similarly, with respect to the third CTS type, one configuration is to base the third CTS type on a control frame format but add additional fields such as a transmitter address field, a receiver address field, a network allocation vector, and a color field to indicate the BSS information. In this configuration, one unused extended control frame subtype may be used to indicate that the frame is a third CTS type compatible with the IEEE 802.11ax standard. In another configuration, the third CTS type may be based on a management frame format. In this configuration, the MAC header may include a transmitter address field, a receiver address field, a network allocation vector, and a BSSID field. In this configuration, one unused reserved management frame subtype may be used to indicate the frame is a colored CTS frame. In another configuration, the third CTS type may be based on a null data frame format. In this configuration, the MAC header may include a transmitter address field, a receiver address field, and a network allocation vector. Color and colored CTS indication may reuse an address 3 field, an address 4 field, and/or sequence control fields. For example, the address 3 field may be set as a reserved MAC address to indicate the frame is a colored CTS, while sequence control field carries the color. The CTS of the third CTS type may be sent with any physical layer preamble compatible with the IEEE 802.11 standard (e.g., an IEEE 802.11ad CTS).

Figure 5A:
FIGS. 5A and 5B illustrate exemplary diagrams of a third RTS type and a third CTS type, respectively.
Figure 5B:

Alternatively, instead of basing the third RTS/CTS types on a control frame, a management frame, or a null frame, an RTS and CTS frame may be redesigned as shown in FIGS. 5A and 5B. FIG. 5A illustrates an exemplary diagram 500 of a third RTS type and FIG. 5B illustrates an exemplary diagram 550 of a third CTS type. Referring to FIG. 5A, the BSS color field may be in the preamble. The MAC portion may carry the RTS content including the transmitter address field, the receiver address field, and the network allocation vector. Wireless devices of the second device type (e.g., legacy nodes) may not decode the frame portion after the legacy preamble. More generally, each of color, transmitter address, receiver address, network allocation vector may be either in the 11ax preamble or in the MAC portion. Similar features apply with respect to the third CTS frame type as show FIG. 5B.

The third RTS type may include one or more of the following: transmitter address, receiver address, BSSID, network allocation vector, new frame type/subtype identifier, color bits, selected MCS for data and/or ACK, amount of buffered data (per TIDs, per access category), required resource (e.g., TXOP, bandwidth), RSSI levels where if another wireless device receives the RTS above that RSSI level the another device defers, indication if deferral is mandatory, levels/threshold which interference must be below, any performance related metrics (e.g., PER, latency, throughput (total, per access category, and/or per session), or transmission power used to send the RTS. The third CTS type may include one or more of the following: transmitter address, receiver address, BSSID, network allocation vector, new frame type/subtype, color bits, selected MCS for data and/or ACK, data to be sent (amount, access category), required resource (e.g. TXOP, bandwidth), RSSI of previous RTS, RSSI levels where if another device receives the CTS above the RSSI level the another device defers, indication if deferral is mandatory, levels/thresholds which interference must be below, any performance related metrics (e.g., PER, latency, throughput (total, per access category, and/or per session)), or transmission power used to send the CTS.

A first, second, or third RTS/CTS type may be used with dynamic sensitivity control (DSC) in a number of ways. In one example, DSC may be used with a lower limit on the energy detection (ED)/preamble detection (PD) levels, and the RTS/CTS types may be used to eliminate hidden nodes. DSC would normally give lower ED/PD levels, but such levels may be capped from going lower than a certain level. This would normally cause hidden nodes, but if RTS/CTS is used then the hidden node problem may be resolved. Wireless devices may use DSC threshold and color to determine if the wireless devices may drop OBSS packets. Some STAs, which may be far from other STAs and may not be protected from hidden nodes using DSC thresholds, may need to send RTS/CTS. In another example, the RTS/CTS can be used with thresholds that are per STA, then the thresholds may be calculated along the same lines as proposed by a DSC algorithm.

Figure 6:
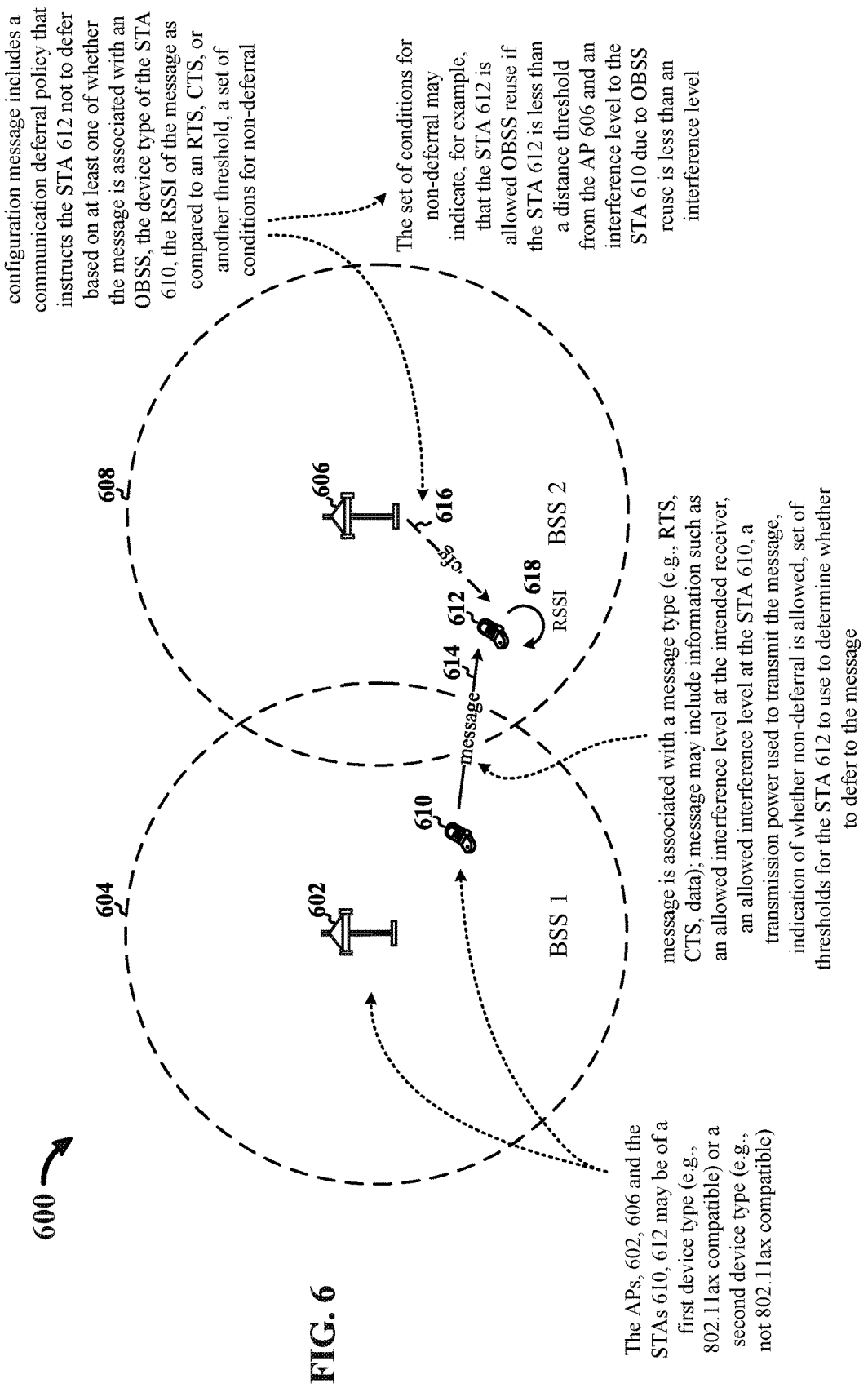
FIG. 6 illustrates a diagram of exemplary methods for determining a communication deferral policy for purposes of BSS reuse control.

FIG. 6 illustrates a diagram 600 of exemplary methods for determining a communication deferral policy for purposes of BSS reuse control. Referring to FIG. 6, BSS 1 includes a first AP 602 serving a first STA 610 in a first BSS 604. BSS 2 includes a second AP 606 serving a second STA 612 in a second BSS 608. The first STA 610 transmits a message 614 (or frame) which is received by the second STA 612. In an aspect, the second STA 612 may measure the RSSI of the received message 614. In another aspect, the second STA 612 may receive a configuration message 616 from the second AP 606. The configuration message 616 may include a communication deferral policy that instructs the second STA 612 when to defer to in-BSS and/or OBSS transmissions. In another aspect, the second STA 612 may be preconfigured with the communication deferral policy. The following discussion illustrates several cases for BSS reuse control. The discussion for each case is based on the following classifications.

Classifications

An 11ax transmitter may transmit 802.11ax messages, which can be identified as being from an 11ax node, including modified legacy 11a/11ac messages (e.g., the second and third RTS/CTS types). 11ax messages are assumed to carry BSS color, or a BSSID.

An 11ax receiver may have configurable rules allowing the 11ax receiver to drop OBSS messages, which may be 11ax or legacy.

A legacy transmitter may transmit legacy 11a/11ac messages (e.g., the first RTS/CTS types), which cannot be identified as being from an 11ax node.

A legacy receiver may have a fixed legacy rules defer to all messages whose network allocation vector is understandable by legacy devices.

Case 1: 11ax Txer in BSS 1, 11ax Rxer in BSS 2

In case 1, the first STA 610 in BSS 1 is an 11ax transmitter, and the second STA 612 BSS 2 is an 11ax receiver. The message dropping decision (e.g., decision to reuse) may be made by BSS 1 only, BSS 2 only, or both. When a BSS makes a decision, the decision maker may be the AP, which may send all or a subset of the STAs the decision/configuration.

Case 1—Option 1: BSS 1 Decides

In one aspect, BSS 1 decides to allow devices in BSS 2 to drop messages from devices in BSS 1. The first AP 602 may determine to allow OBSS reuse, not to allow OBSS reuse, or allow OBSS reuse but with additional conditions mentioned previously, or leave the decision to the first STA 610. For example, the first AP 602 may prohibit devices in BSS 2 from dropping packets from BSS 1 packets if most STAs in BSS 1 report poor performance. In this aspect, the transmitter decides if reuse can happen. In an aspect, the first AP 602 may tell all STAs to allow OBSS reuse, all STAs to disallow OBSS reuse, or some STAs to allow OBSS reuse. A group of STAs within all the STAs of BSS 1 may be chosen to allow OBSS reuse if those STAs are close the first AP 602 (e.g., have an RSSI from the first AP 602 that is greater than a threshold). Also, the first AP 602 may allow STAs (e.g., the first STA 610) to decide whether allow OBSS reuse. The first AP 602 may provide the first STA 610 with information how to decide whether to allow OBSS reuse. The first AP 602 may allow OBSS reuse on top of a transmission associated with the BSS 1 because the first AP 602 may have incentives to do so. For example, the first AP 602 may be allowed longer TXOPs and/or better EDCA parameters (e.g., smaller CWMin, which corresponds to a smaller minimum contention window wait time to grab the medium) if the first AP 602 allows BSS 2 devices to transmit on top of packets from BSS 1. The first AP 602 may decide if other OBSSs (e.g., the BSS 2) may reuse by determining an effective BSS distance between BSS 1 and BSS 2. If the effective BSS distance is above a threshold, then the first AP 602 may allow reuse. The effective BSS distance may be a function of a distance between the first AP 602 and the second AP 606 and the distance of the each STA within a BSS to an associated serving AP. The larger the AP to AP distance, the larger the effective BSS distance. Also, if STAs are far from the serving AP, the smaller the effective BSS distance.

Based on the foregoing, the first AP 602 may determine a communication deferral policy for the group of STAs within the BSS 1. The first AP 602 may transmit a configuration message to the group of STAs (all the STAs or some of the STAs in BSS 1), and the configuration message may indicate the determined communication policy. In an aspect, the communication deferral policy may be transmitted in an information element. The configuration message may include an indicator that indicates whether OBSS reuse is allowed. If OBSS reuse is allowed (e.g., not deferring to OBSS transmissions), the configuration message may include additional conditions on when OBSS reuse is allowed. In one aspect, the conditions may indicate that OBSS reuse is allowed when the message is received at an RSSI lower than a given threshold. In another aspect, the conditions may indicate a maximum interference level that can be caused by OBSS reuse, below which the OBSS node may perform OBSS reuse. These conditions/parameters may be included in RTS/CTS messages, or even in data packets, for OBSS nodes to decide whether OBSS reuse is allowed. A STA may further include information to aid an OBSS node to estimate caused interference (e.g., transmission power). The configuration message may include conditions that prohibit OBSS reuse. For example, the conditions may indicate that a STA may prohibit OBSS reuse if a certain metric is poor. For example, if the STA has throughput, goodput, or air time below a threshold, or a packet error rate (PER)/access latency above a threshold, the STA may be asked to ensure that OBSS devices do not transmit on top of messages from the STA. These conditions may be included in the configuration message. In an aspect, the first STA 610 may allow or disallow OBSS reuse may be a function of the frame type or subtype. For example, a scheduling frame soliciting a long response may need better protection from OBSS reuse. The first AP 602 may prohibit OBSS reuse for those types. In aspect, if the communication deferral policy only applies to a subset of STAs, the configuration message may include a group identifier/indicator that indicates which STAs should use the communication deferral policy. If the first AP 502 determines not to allow OBSS reuse, a node may have the following method to prohibit OBSS reuse. For example, a node can prohibit OBSS nodes from ignoring a frame associated with the node by using a reserved "deferral" color (or a reserved BSSID) in a message. OBSS nodes may be required to defer to a message/frame if the OBSS node identifies the reserved BSSID/color in the message. In another aspect, the node can prohibit OBSS reuse by indicating in a message that a BSS identifier is absent or invalid. For example, 1 bit in the message may be used to indicate a color field does not exist or is invalid. OBSS nodes may defer to the message if such a bit is set. In another aspect, a node may prohibit OBSS reuse by using a legacy frame format. For example, the node may use unmodified legacy 11a/11ac frames such that 11ax devices are required to device when encountering an 11a/11ac frame.

Case 1—Option 2: BSS 2 Decides

In another aspect, BSS 2 decides whether devices in the BSS may drop messages from devices in BSS 1. For example, the second STA 612 drops the message 614 if the potential impact to the transmission in BSS 1 is small (e.g., the RSSI of the message 614 is less than a threshold). In this aspect, the receivers decide if reuse can happen. The second AP 606 determines whether devices associated with the second AP 606 should drop, not drop, or drop based on conditions, which could include conditions in the message 614. The second AP 606 may allow all STAs in the BSS (e.g., the second STA 612) to drop all OBSS 11ax packets or drop some OBSS 11ax packets based certain criteria (e.g., an RSSI of an RTS message is less than a first threshold and/or an RSSI of a CTS message is less than a second threshold). Different threshold can be used for different STAs. The second AP 606 may determine to allow a group of STAs to drop all OBSS packets. The group of STAs may be selected based on RSSI from the second AP 606 or an average MCS supported for a link to the second AP 606. The second AP 606 may determine to allow a group of STAs to drop some OBSS packets. The group of STAs may be selected based on RSSI from the second AP 606 or an average MCS supported for a link to the second AP 606. The OBSS packets to be dropped may be based on the type of OBSS packet. The foregoing decisions may be used to determine a communication deferral policy, which the second AP 606 may transmit to various STAs in the BSS 2 in a configuration message. The communication deferral policy may be transmitted in an information element of the configuration message. The configuration message may include an indicator that indicates whether OBSS messages may be dropped, and if OBSS message may be dropped, which colors are acceptable to drop. The configuration message may include conditions for STAs to drop OBSS messages such as an RSSI threshold, where if a device receives an OBSS message below the RSSI threshold, the device may drop the message, a maximum allowed interference below which the STA can drop the OBSS frame, and/or a method of calculating an RSSI threshold, where if the message is received by an OBSS device below the RSSI threshold, the message may be dropped. The configuration message may indicate which frame types and subtypes may be dropped. The configuration message may indicate a group identifier or indicator associated with a group of STAs to which the configuration message applies, and the group of STAs may be selected, for example, based on an effective BSS distance. The AP 606 may decide that messages from BSS1 may be dropped by devices in BSS2 if the effective BSS distance between the two BSSs is large enough (e.g., above a distance threshold).

Case 1—Option 3: BSS 2's decision depends on BSS 1's decision

In yet another aspect, BSS 2's decision depends on BSS 1's decision. For example, the second AP 606 may decide to drop messages from BSS 1 if the first AP 602 has decided to drop messages from BSS 2. The first AP 602 and the second AP 606 may broadcast the OBSS colors (or BSSIDs), to be ignored by the respective devices, in beacons, for example. If the first AP 602 knows that the second AP 606 has devices in BSS2 ignoring the color associated with the first AP 602, then the first AP 602 may have the devices in BSS1 ignore the color (or BSSID) associated with the second AP 606. The first AP 602 may learn which OBSS colors are being ignored by the OBSS via direct decoding or via STA reports of beacons from OBSS APs, or backhaul communications with an OBSS AP. In this aspect, both BSSs may jointly decide to drop frames from each other. Alternatively, both BSS 1 and BSS 2 may jointly decide to drop frames from each other or from all neighboring BSSs. Both the first AP 602 and the second AP 606 may negotiate via direct over the air message, a STA relay, or backhaul communications.

Case 2: Legacy Txer in BSS 1, 11ax Rxer in BSS 2

In case 2, BSS 1 is a legacy transmitter, and BSS 2 is an 11ax receiver. The message dropping decision (e.g., decision to reuse) may be made by BSS 2. When a BSS makes a decision, the decision maker may be the AP, which may send all or a subset of the STAs the decision/configuration. In case 2, the legacy transmitter transmits unmodified legacy frames, which may carry BSSID (e.g., from a receiver address field in an 11a RTS, PAID in 11ac data frame, or 11a CTS following 11a RTS with BSSID). BSS 2 reuse decision may be based on whether the BSSID may be identified from legacy frames. If BSSID cannot be identified, then the decision can be to not reuse (or to reuse). Otherwise, if BSSID is OBSS, the decision can be BSS specific or common for all OBSSs. If BSSID is also BSS 2, decision can be not to reuse. In BSS 2, the second AP 606 may decide reuse. Alternatively, the second STA 612 may decide reuse with AP configured criteria. In both cases, the second AP 606 may send reuse/configuration message to the STAs to convey reuse decision/criteria.

Case 3: 11ax Txer in BSS 1, Legacy Rxer in BSS 2

In case 3, BSS 1 is an 11ax transmitter, and BSS 2 is a legacy receiver. The message dropping decision (e.g., decision to reuse) may be made by BSS 1. When a BSS makes a decision, the decision maker may be the AP, which may send all or a subset of the STAs the decision/configuration. In this case, the 11ax transmitter sends frames/messages with color defined in 11ax, including modify legacy frames with implicit color. BSS 1 decides if legacy receiver in BSS 2 should defer or not. If BSS 2 should defer, 11ax transmitter in BSS 1 should send modified legacy frames with implicit color. Otherwise, 11ax frames should be sent with a network allocation vector is that undecodable by legacy nodes. The first AP 602 in BSS 1 will send a configuration message to STAs associated with the first AP 602.

Figure 13:
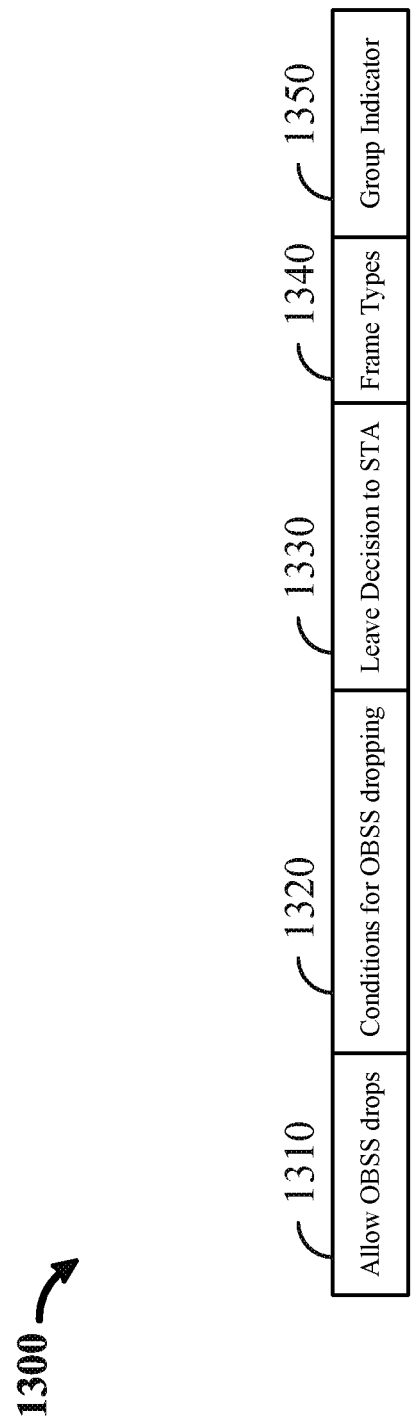
FIG. 13 illustrates an exemplary diagram of an information element for indicating a communication deferral policy.

As indicated above, the AP may determine a communication deferral policy, which may be transmitted within an information element. FIG. 13 illustrates an exemplary diagram 1300 of the information element for indicating a communicating deferral policy. Although the diagram 1300 includes a number of fields or flags, the information element may include any number of fields or flags. Referring to FIG. 13, a first field 1310 may be a flag or bit indicator that indicates whether OBSS dropping (not deferring) is allowed (e.g., when set to 1, OBSS dropping is allowed, but when set to 0, OBSS dropping is not allowed). The second field 1320 may include one or more conditions for OBSS dropping. For example, if OBSS dropping is allowed, the AP may specify additional conditions such as dropping OBSS messages (not deferring) is allowed if the RSSI of a received message is below an RSSI threshold. In another example, the second field 1320 may indicate that maximum allowed interference below which a device can drop the OBSS message. Upon receiving the information element, STAs may include such conditions in RTS, CTS, or data frames. The third field 1330 may include a flag or bit indicator indicating whether the STA may prohibit OBSS dropping if a certain metric is poor. For example, if a STA's throughput or airtime is below a threshold or the packet error rate or access latency is greater than a threshold. In an aspect, such thresholds may be transmitted by the AP (e.g., within a subfield in the information element). The fourth field 1340 may indicate which frame types OBSS dropping will be applied to, such as RTS, CTS, or data frames. The fifth field 1350 may be a group indicator that specifies which group of STAs to which the information element applies if the information element is broadcast.

Figure 7:
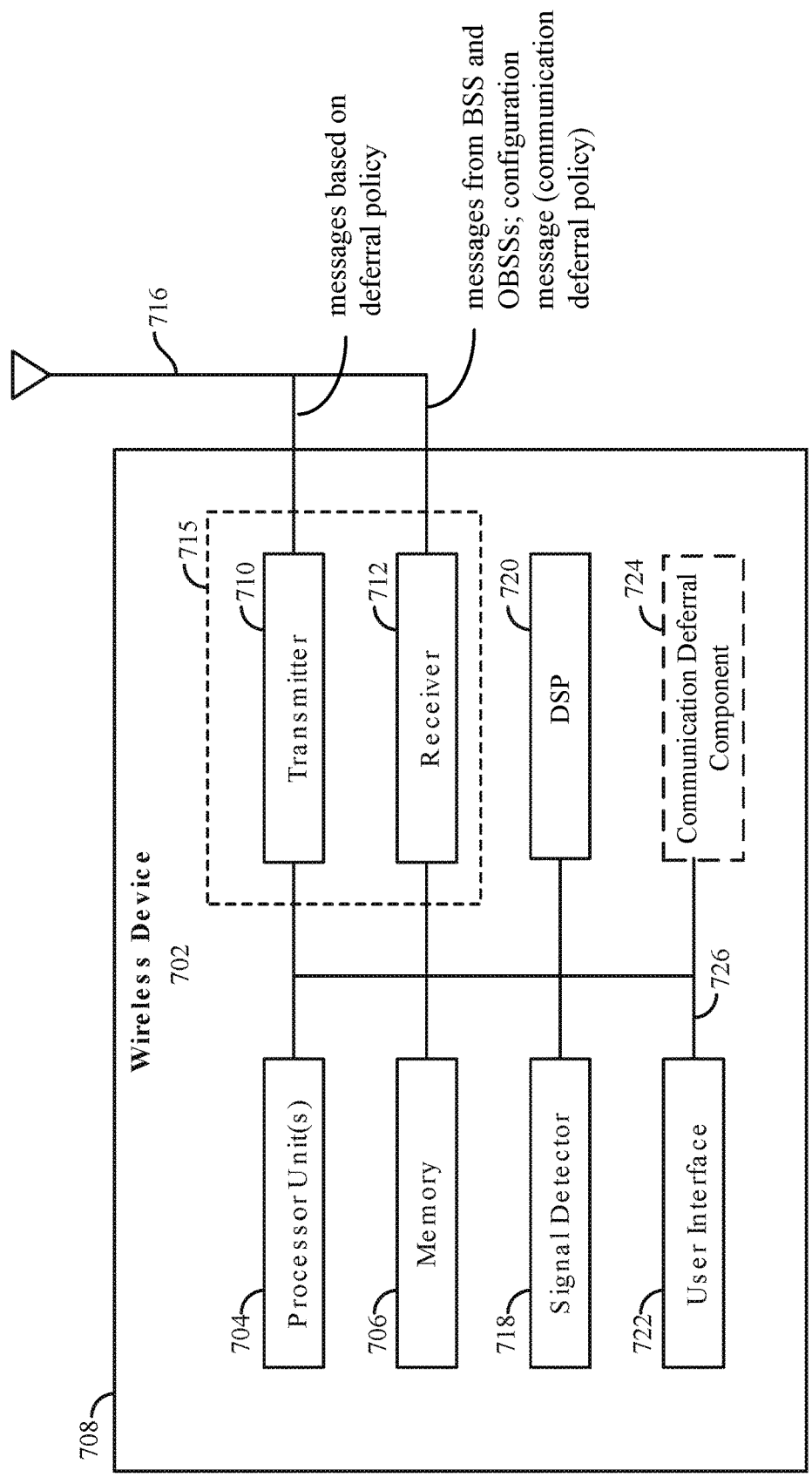
FIG. 7 shows an example functional block diagram of a wireless device that may determine whether to defer communications within and outside of the wireless communication system of FIG. 1.

FIG. 7 shows an example functional block diagram of a wireless device 702 that may determine whether to defer communications within and outside of the wireless communication system 100 of FIG. 1. The wireless device 702 is an example of a device that may be configured to implement the various methods described herein. For example, the wireless device 702 may comprise one of the STAs 112, 114, 116, 118, or the AP 104.

The wireless device 702 may include a processor 704 which controls operation of the wireless device 702. The processor 704 may also be referred to as a central processing unit (CPU). Memory 706, which may include both read-only memory (ROM) and random access memory (RAM), may provide instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable (by the processor 704, for example) to implement the methods described herein.

The processor 704 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 702 may also include a housing 708, and the wireless device 702 may include a transmitter 710 and/or a receiver 712 to allow transmission and reception of data between the wireless device 702 and a remote device. The transmitter 710 and the receiver 712 may be combined into a transceiver 714. An antenna 716 may be attached to the housing 708 and electrically coupled to the transceiver 714. The wireless device 702 may also include multiple transmitters, multiple receivers, multiple transceivers, and/or multiple antennas.

The wireless device 702 may also include a signal detector 718 that may be used to detect and quantify the level of signals received by the transceiver 714 or the receiver 712. The signal detector 718 may detect such signals as total energy, energy per subcarrier per symbol, power spectral density, and other signals. The wireless device 702 may also include a digital signal processor (DSP) 720 for use in processing signals. The DSP 720 may be configured to generate a packet for transmission. In some aspects, the packet may comprise a physical layer convergence procedure (PLCP) protocol data unit (PPDU).

The wireless device 702 may further comprise a user interface 722 in some aspects. The user interface 722 may comprise a keypad, a microphone, a speaker, and/or a display. The user interface 722 may include any element or component that conveys information to a user of the wireless device 702 and/or receives input from the user.

When the wireless device 702 is implemented as a STA (e.g., the STA 114) or as an AP (e.g., the AP 104), the wireless device 702 may also comprise a communication deferral component 724. The communication deferral component 724 may be configured to perform one or more of the functions described herein. The communication deferral component 724 may be configured to determine a communication deferral policy within a BSS associated with the wireless device 702. The communication deferral component 724 may be configured to receive a message from a second wireless device. The communication deferral component 724 may be configured to determine a message type of the message. The communication deferral component 724 may be configured to determine whether the message is associated with an OBSS based on the determined message type. The communication deferral component 724 may be configured to determine whether to defer communications based on the communication deferral policy, the message type, and whether the message is associated with the OBSS. In one configuration, the communication deferral component 724 may be configured to receive a configuration message, in which the configuration message may include the communication deferral policy. The communication deferral policy may be determined based on the configuration message. In an aspect, the communication deferral policy may instruct the wireless device 702 whether to defer based on one or more of: a device type of the second wireless device, a received signal strength of the message received from the second wireless device, and/or information included in the message from the second wireless device. In another aspect, the information included in the message may include an allowed interference level at an intended receiver of the message from the second wireless device, an allowed interference level at the second wireless device, a transmission power used to transmit the message, an MCS of data to be sent or received by the second wireless device, an indication of whether non-deferral is allowed, and/or a set of thresholds for the wireless device 702 to use for determining whether to defer. In another aspect, the communication deferral policy may instruct the wireless device 702 to defer communications when the message is associated with the BSS. In another aspect, the communication deferral policy may further instruct the wireless device 702 not to defer communications based on at least one of whether the message is associated with the OBSS, the second wireless device is of the first device type or a second device type, a received signal strength of the message is below a first threshold, the received signal strength of the message is below a RTS threshold if the message is an RTS message, the received signal strength of the message is below a CTS threshold if the message is a CTS message, the received signal strength of the message is below a second threshold associated with the wireless device 702, and/or a set of conditions for non-deferral included in the message are met. In another aspect, the communication deferral policy may instruct the wireless device 702 not to defer communications if the message is associated with the OBSS. In another aspect, the communication deferral policy may instruct the wireless device 702 not to defer communications if the message is associated with the OBSS and the received signal strength of the message is below the first threshold. In another aspect, the communication deferral policy may instruct the wireless device 702 not to defer communications if the second wireless device is of the first device type and the message is associated with the OBSS. In another aspect, the communication deferral policy may instruct the wireless device 702 not to defer communications based on a device type of the second wireless device and on the message type of the message. In another aspect, the communication deferral policy may instruct the wireless device 702 whether to allow OBSS reuse based on a set of conditions. In another aspect, the set of conditions may indicate that the wireless device 702 is allowed OBSS reuse if the wireless device 702 is less than a distance threshold from a serving AP. In another aspect, the set of conditions may indicate that the wireless device 702 is allowed OBSS reuse if the wireless device 702 is less than a distance threshold from a serving AP, and an interference level to the second wireless device due to OBSS reuse is less than a first interference level or the interference level to an intended recipient of the message due to OBSS reuse is less than a second interference level. In another configuration, the communication deferral component 724 may be configured to determine whether the message is associated with the OBSS is based on a BSS identifier in the message. In another configuration, the communication deferral component 724 may be configured to determine the message type by determining whether the message is an RTS message, a CTS message, or a data packet. In another configuration, the communication deferral component 724 may be configured to determine the message type by performing at least one of determining whether the message is a first RTS type, a second RTS type, or a third RTS type when the message is an RTS message and/or by determining whether the message is a first CTS type, a second RTS type, or a third CTS type when the message is a CTS message. In another aspect, the first RTS type may include a BSS identifier in a receiver address field or a transmitter address field. In another aspect, the second RTS type may include a BSS identifier in a receiver address field or a transmitter address field and include a device type indicator in one or more of the receiver address field, the transmitter address field, a scrambling seed field, a signal field, a service field, or a frame control field. In another aspect, the third RTS type may include at least one of BSS identifier field and a device type indicator and may further include an RSSI threshold that enables the wireless device 702 to determine whether non-deferral is allowed, an allowed interference level at the second wireless device or at an intended receiver of the message to determine whether non-deferral is allowed, an MCS of data to be sent or received by the second wireless device, a set of performance requirements, or information about a buffer status associated with multiple traffic identifiers or access classes. In another aspect, the first CTS type may include a BSS identifier in a receiver address field if the wireless device 702 is a station. In this aspect, the second RTS type may include at least one of the BSS identifier or a device type indicator in one or more of the receiver address field, a scrambling seed field, a signal field, a service field, or a frame control field. In another aspect, the third CTS type may include at least one of BSS identifier field and a device type indicator. In this aspect, the third CTS type may further include an RSSI threshold that enables the wireless device 702 to determine whether non-deferral is allowed, an allowed interference level at the second wireless device or at an intended receiver of the message to determine whether non-deferral is allowed, an MCS of data to be sent or received by the second wireless device, and/or a set of performance requirements. In another configuration, the communication deferral component 724 may be configured to determine whether the second wireless device is of the first device type or a second device type based on a device type indicator included in the message. The determination of whether to defer communications may be further based on whether the second wireless device is of the first device type or the second device type. In another configuration, the communication deferral component 724 may be configured to transmit a quiet interval to instruct wireless devices associated with the BSS to defer communications and to transmit a quiet element cancellation decodable by wireless devices of the first device type. In another configuration, the communication deferral component 724 may be configured to transmit an RTS message with a network allocation vector that only accounts for a CTS message, to transmit a RTS message or a CTS message that is not decodable by wireless device of a second device type, or to transmit a RTS message or a CTS message at a transmission power below a power threshold or at a transmission rate above a rate threshold. In another configuration, the communication deferral component 724 may be configured to transmit a second message. The second message may indicate that OBSS reuse is not allowed by indicating a reserved BSS identifier, in which the reserved BSS identifier indicates that OBSS reuse is disallowed, indicate that a BSS identifier is absent or invalid to disallow OBSS reuse, indicate that the second message is of a first RTS type or a first CTS type.

The various components of the wireless device 702 may be coupled together by a bus system 726. The bus system 726 may include a data bus, for example, as well as a power bus, a control signal bus, and a status signal bus in addition to the data bus. Components of the wireless device 702 may be coupled together or accept or provide inputs to each other using some other mechanism.

Although a number of separate components are illustrated in FIG. 7, one or more of the components may be combined or commonly implemented. For example, the processor 704 may be used to implement not only the functionality described above with respect to the processor 704, but also to implement the functionality described above with respect to the signal detector 718, the DSP 720, the user interface 722, and/or the communication deferral component 724. Further, each of the components illustrated in FIG. 7 may be implemented using a plurality of separate elements.

Figure 8:
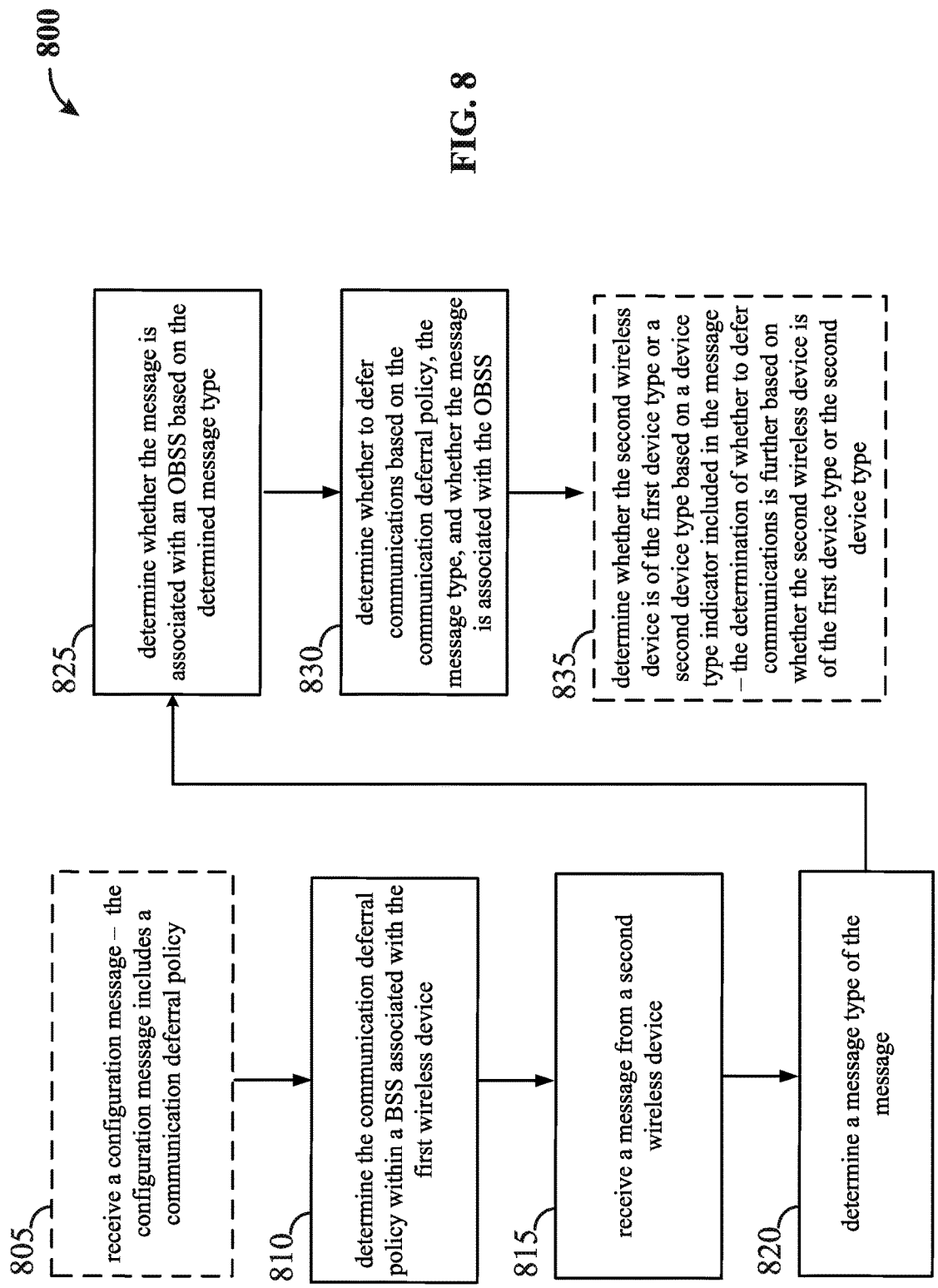
FIG. 8 is a flowchart of an example method 800 for determining whether to defer communications in a wireless network.

FIG. 8 is a flowchart of an example method 800 for determining whether to defer communications in a wireless network. The method 800 may be performed using an apparatus (e.g., the STA 114, the AP 104, the wireless device 210, the wireless device 310, the wireless device 410, or the wireless device 702, for example). Although the method 800 is described below with respect to the elements of wireless device 702 of FIG. 7, below, other components may be used to implement one or more of the steps described herein.

At block 805, the apparatus may receive a configuration message. The configuration message may include a communication deferral policy. For example, referring to FIG. 3, if the wireless device 310 is a STA, the wireless device 310 may receive a configuration message from a serving AP. The configuration message may include a communication deferral policy. However, if the wireless device 310 is an AP, then the wireless device 310 may not receive a configuration message that includes a communication deferral policy.

At block 810, the apparatus may determine the communication deferral policy within a BSS associated with the apparatus. For example, referring to FIG. 3, if the wireless device 310 is a STA, the wireless device 310 may determine the communication deferral policy within a BSS associated with the wireless device 310 based on the communication deferral policy received in the configuration message. In an aspect, the wireless device 310 may determine whether the communication deferral policy is intended for the wireless device 310 (e.g., based on an identifier in the configuration message). If the communication deferral policy is intended for the wireless device 310, then the wireless device 310 may utilize the communication policy. Otherwise, the wireless device 310 may not utilize the communication policy. In another aspect, if the wireless device 310 is an AP, then the wireless device 310 may determine the communication policy based on whether the STAs within a BSS associated with the wireless device 310 have good throughput, whether an OBSS is allowing OBSS reuse with respect to the BSS associated with the wireless device 310, and other factors.

At block 815, the apparatus may receive a message from a second wireless device. For example, referring to FIG. 3, the wireless device 310 may receive a message from one of the wireless devices 314, 316, 318, 320.

At block 820, the apparatus may determine a message type of the message. For example, referring to FIG. 3, the wireless device 310 may determine a message type of the message. The message type may be an RTS message, a CTS message, or data packet. If the message is an RTS message, the wireless device 310 may determine if the RTS message is a first RTS type, a second RTS type, or a third RTS type. If the message is a CTS message, the wireless device 310 may determine if the RTS message is a first CTS type, a second CTS type, or a third CTS type.

The first RTS type may include a BSS identifier in a receiver address field or a transmitter address field. The second RTS type may include a BSS identifier in the receiver address field or the transmitter address field and may include a device type indicator in one or more of the receiver address field, the transmitter address field, a scrambling seed field, a signal field, a service field, or a frame control field. Third RTS type may include at least one of BSS identifier field and a device type indicator and may further include an RSSI threshold that enables the wireless device 310 to determine whether non-deferral is allowed, an allowed interference level at the second wireless device or at an intended receiver of the message to determine whether non-deferral is allowed, an MCS of data to be sent or received by the second wireless device, a set of performance requirements, or information about a buffer status associated with multiple traffic identifiers or access classes.

The first CTS type may include a BSS identifier in a receiver address field if the wireless device 310 is a station. The second RTS type may include at least one of the BSS identifier or a device type indicator in one or more of the receiver address field, a scrambling seed field, a signal field, a service field, or a frame control field. Third CTS type may include at least one of BSS identifier field and a device type indicator and may further include one or more of an RSSI threshold that enables the wireless device 310 to determine whether non-deferral is allowed, an allowed interference level at the second wireless device or at an intended receiver of the message to determine whether non-deferral is allowed, a MCS of data to be sent or received by the second wireless device, or a set of performance requirements.

At block 825, the apparatus may determine whether the message is associated with an OBSS based on the determined message type. For example, referring to FIG. 3, the wireless device 310 may determine whether the message is associated with a BSS or an OBSS based on the determined message type. In an aspect, the wireless device 310 may determine whether the message includes a BSSID. In this aspect, if the message has a BSSID, the determination may be based on whether the BSSID is associated with an OBSS or a BSS. If the message does not have a BSSID, the determination may be based on whether the message is received SIFS after an OBSS RTS message or a SIFS after an OBSS CTS message, which was received a SIFS after an OBSS RTS message.

At block 830, the apparatus may determine whether to defer communications based on the communication deferral policy, the message type, and whether the message is associated with the OBSS. For example, referring to FIG. 3, the wireless device 310 may determine whether to defer communications based on the communication deferral policy, the message type of the message, and whether the message is associated with the OBSS. In an aspect, the communication deferral policy may instruct the first wireless device whether to defer based on one or more of a device type of the second wireless device (e.g., legacy or 11ax product), a received signal strength (e.g., RSSI or SINR) of the message received from the second wireless device, information included in the message from the second wireless device. In this aspect, information included in the message may include an allowed interference level at an intended receiver of the message from the second wireless device (e.g., when the message is an RTS message, the RTS message may indicate an allowed interference level at the intended receiver of the RTS message), an allowed interference level at the second wireless device (e.g., when the message is a CTS message that indicates an allowed interference level at the second wireless device), a transmission power used to transmit the message, a MCS of data to be sent or received by the second wireless device, an indication of whether non-deferral is allowed, or a set of thresholds for the wireless device 310 to use for determining whether to defer. For example, the set of thresholds may include RSSI/SINR thresholds, and if the message is received at RSSIs/SINRs below the thresholds, then the wireless device 310 may choose not to defer (i.e., perform OBSS reuse). In another aspect, the communication deferral policy instructs the apparatus to defer communications when the message is associated with the BSS. In another aspect, the communication deferral policy instructs the wireless device 310 not to defer communications when the message is associated with an OBSS. In yet another aspect, the communication deferral policy may instruct the wireless device 310 not to defer communications based on the message being associated with the OBSS and based on whether the second wireless device is of the first device type (e.g., IEEE 802.11a/ac) or a second device type (e.g., IEEE 802.11ax), a received signal strength (e.g., RSSI or SINR) of the message is below a first threshold, the received signal strength of the message is below an RTS threshold if the message is an RTS message, the received signal strength of the message is below a CTS threshold if the message is a CTS message, the received signal strength of the message is below a second threshold associated with the first wireless device, or a set of conditions for non-deferral included in the message are met. For example, the set of conditions may indicate that if RSSI/SINR of the message is above a threshold, then the wireless device 310 may defer. The set of conditions may indicate that deferral is mandatory. The set of conditions may indicate maximum interference levels that the wireless device 310 may cause to the second wireless device by not deferring and performing OBSS reuse. Any other conditions set forth herein may also be used. In another aspect, the communication deferral policy may instruct the wireless device 310 not to defer communications if the message is associated with the OBSS and the received signal strength of the message is below the first threshold (e.g., a first RSSI or SINR threshold). In another aspect, the communication deferral policy may instruct the wireless device 310 not to defer communications if the second wireless device is of the first device type (e.g., IEEE 802.11ax compatible product) and the message is associated with the OBSS. The communication deferral policy may instruct the wireless device 310 not to defer communications based on a device type of the second wireless device (e.g., IEEE 802.11ax compatible product or not) and on the message type of the message. In another aspect, the communication deferral policy may instruct the wireless device 310 whether to allow OBSS reuse based on a set of conditions. In this aspect, the set of conditions may indicate that the wireless device 310 is allowed OBSS reuse if the wireless device 310 is less than a distance threshold from a serving AP. The set of conditions may indicate that the wireless device 310 is allowed OBSS reuse if the wireless device 310 is less than a distance threshold from a serving AP and, an interference level to the second wireless device due to OBSS reuse is less than a first interference level or the interference level to an intended recipient of the message due to OBSS reuse is less than a second interference level.

At block 835, the apparatus may determine whether the second wireless device is of the first device type or a second device type based on a device type indicator included in the message. The determination of whether to defer communications may be further based on whether the second wireless device is of the first device type or the second device type. For example, referring to FIG. 3, the wireless device 310 may determine whether the second wireless device is of the first device type (e.g., IEEE 802.11ax compatible product) or a second device type (e.g., an IEEE 802.11a/ac product). The wireless device 310 may determine whether to defer communications based on wither the second wireless device is of the first device type or the second device type. For example, the wireless device 310 may defer communications if the message is associated with an OBSS and the message is from a second device type.

Figure 9:
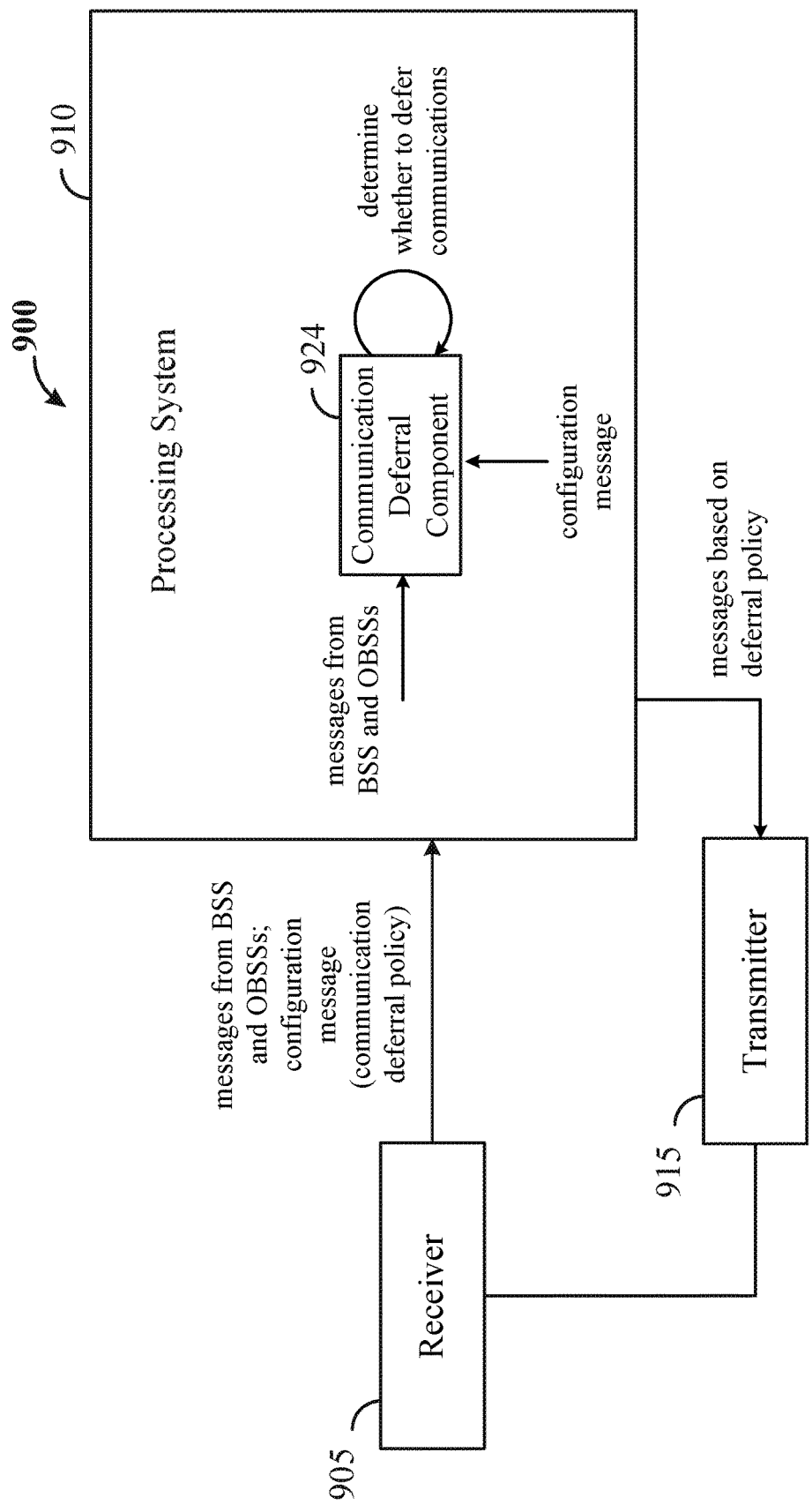
FIG. 9 is a functional block diagram of an example wireless communication device that may determine whether to defer communications in a wireless network.

FIG. 9 is a functional block diagram of an example wireless communication device 900 that may determine whether to defer communications in a wireless network. The wireless communication device 900 may include a receiver 905, a processing system 910, and a transmitter 915. The processing system 910 may include a communication deferral component 924. The communication deferral component 924 and/or the processing system 910 may be configured to determine a communication deferral policy within a BSS associated with the wireless communication device 900. The communication deferral component 924, the processing system 910, and/or the receiver 905 may be configured to receive a message from a second wireless device. The communication deferral component 924 and/or the processing system 910 may be configured to determine a message type of the message. The communication deferral component 924 and/or the processing system 910 may be configured to determine whether the message is associated with an OBSS based on the determined message type. The communication deferral component 924 and/or the processing system 910 may be configured to determine whether to defer communications based on the communication deferral policy, the message type, and whether the message is associated with the OBSS. In one configuration, the communication deferral component 924, the processing system 910, and/or the receiver 905 may be configured to receive a configuration message, in which the configuration message may include the communication deferral policy. The communication deferral policy may be determined based on the configuration message. In an aspect, the communication deferral policy may instruct the wireless communication device 900 whether to defer based on one or more of: a device type of the second wireless device, a received signal strength of the message received from the second wireless device, and/or information included in the message from the second wireless device. In another aspect, the information included in the message may include an allowed interference level at an intended receiver of the message from the second wireless device, an allowed interference level at the second wireless device, a transmission power used to transmit the message, an MCS of data to be sent or received by the second wireless device, an indication of whether non-deferral is allowed, and/or a set of thresholds for the wireless communication device 900 to use for determining whether to defer. In another aspect, the communication deferral policy may instruct the wireless communication device 900 to defer communications when the message is associated with the BSS. In another aspect, the communication deferral policy may further instruct the wireless communication device 900 not to defer communications based on at least one of whether the message is associated with the OBSS, the second wireless device is of the first device type or a second device type, a received signal strength of the message is below a first threshold, the received signal strength of the message is below a RTS threshold if the message is an RTS message, the received signal strength of the message is below a CTS threshold if the message is a CTS message, the received signal strength of the message is below a second threshold associated with the wireless communication device 900, and/or a set of conditions for non-deferral included in the message are met. In another aspect, the communication deferral policy may instruct the wireless communication device 900 not to defer communications if the message is associated with the OBSS. In another aspect, the communication deferral policy may instruct the wireless communication device 900 not to defer communications if the message is associated with the OBSS and the received signal strength of the message is below the first threshold. In another aspect, the communication deferral policy may instruct the wireless communication device 900 not to defer communications if the second wireless device is of the first device type and the message is associated with the OBSS. In another aspect, the communication deferral policy may instruct the wireless communication device 900 not to defer communications based on a device type of the second wireless device and on the message type of the message. In another aspect, the communication deferral policy may instruct the wireless communication device 900 whether to allow OBSS reuse based on a set of conditions. In another aspect, the set of conditions may indicate that the wireless communication device 900 is allowed OBSS reuse if the wireless communication device 900 is less than a distance threshold from a serving AP. In another aspect, the set of conditions may indicate that the wireless communication device 900 is allowed OBSS reuse if the wireless communication device 900 is less than a distance threshold from a serving AP, and an interference level to the second wireless device due to OBSS reuse is less than a first interference level or the interference level to an intended recipient of the message due to OBSS reuse is less than a second interference level. In another configuration, the communication deferral component 924 and/or the processing system 910 may be configured to determine whether the message is associated with the OBSS is based on a BSS identifier in the message. In another configuration, the communication deferral component 924 and/or the processing system 910 may be configured to determine the message type by determining whether the message is an RTS message, a CTS message, or a data packet. In another configuration, the communication deferral component 924 and/or the processing system 910 may be configured to determine the message type by performing at least one of determining whether the message is a first RTS type, a second RTS type, or a third RTS type when the message is an RTS message and/or by determining whether the message is a first CTS type, a second RTS type, or a third CTS type when the message is a CTS message. In another aspect, the first RTS type may include a BSS identifier in a receiver address field or a transmitter address field. In another aspect, the second RTS type may include a BSS identifier in a receiver address field or a transmitter address field and include a device type indicator in one or more of the receiver address field, the transmitter address field, a scrambling seed field, a signal field, a service field, or a frame control field. In another aspect, the third RTS type may include at least one of BSS identifier field and a device type indicator and may further include an RSSI threshold that enables the wireless communication device 900 to determine whether non-deferral is allowed, an allowed interference level at the second wireless device or at an intended receiver of the message to determine whether non-deferral is allowed, an MCS of data to be sent or received by the second wireless device, a set of performance requirements, or information about a buffer status associated with multiple traffic identifiers or access classes. In another aspect, the first CTS type may include a BSS identifier in a receiver address field if the wireless communication device 900 is a station. In this aspect, the second RTS type may include at least one of the BSS identifier or a device type indicator in one or more of the receiver address field, a scrambling seed field, a signal field, a service field, or a frame control field. In another aspect, the third CTS type may include at least one of BSS identifier field and a device type indicator. In this aspect, the third CTS type may further include an RSSI threshold that enables the wireless communication device 900 to determine whether non-deferral is allowed, an allowed interference level at the second wireless device or at an intended receiver of the message to determine whether non-deferral is allowed, an MCS of data to be sent or received by the second wireless device, and/or a set of performance requirements. In another configuration, the communication deferral component 924 and/or the processing system 910 may be configured to determine whether the second wireless device is of the first device type or a second device type based on a device type indicator included in the message. The determination of whether to defer communications may be further based on whether the second wireless device is of the first device type or the second device type. In another configuration, the communication deferral component 924, the processing system 910, and/or the transmitter 915 may be configured to transmit a quiet interval to instruct wireless devices associated with the BSS to defer communications and to transmit a quiet element cancellation decodable by wireless devices of the first device type. In another configuration, the communication deferral component 924, the processing system 910, and/or the transmitter 915 may be configured to transmit an RTS message with a network allocation vector that only accounts for a CTS message, to transmit a RTS message or a CTS message that is not decodable by wireless device of a second device type, or to transmit a RTS message or a CTS message at a transmission power below a power threshold or at a transmission rate above a rate threshold. In another configuration, the communication deferral component 924, the processing system 910, and/or the transmitter 915 may be configured to transmit a second message. The second message may indicate that OBSS reuse is not allowed by indicating a reserved BSS identifier, in which the reserved BSS identifier indicates that OBSS reuse is disallowed, indicate that a BSS identifier is absent or invalid to disallow OBSS reuse, indicate that the second message is of a first RTS type or a first CTS type.

The receiver 905, the processing system 910, the communication deferral component 924, and/or the transmitter 915 may be configured to perform one or more functions discussed above with respect to blocks 805, 810, 815, 820, 825, 830, 835 of FIG. 8. The receiver 905 may correspond to the receiver 712. The processing system 910 may correspond to the processor 704. The transmitter 915 may correspond to the transmitter 710. The communication deferral component 924 may correspond to the communication deferral component 126.

In one configuration, the wireless communication device 900 may include means for determining a communication deferral policy within a BSS associated with the wireless communication device 900. The wireless communication device 900 may include means for receiving a message from a second wireless device. The wireless communication device 900 may include means for determining a message type of the message. The wireless communication device 900 may include means for determining whether the message is associated with an OBSS based on the determined message type. The wireless communication device 900 may include means for determining whether to defer communications based on the communication deferral policy, the message type, and whether the message is associated with the OBSS. In one configuration, the wireless communication device 900 may include means for receiving a configuration message, in which the configuration message may include the communication deferral policy. The communication deferral policy may be determined based on the configuration message. In an aspect, the communication deferral policy may instruct the wireless communication device 900 whether to defer based on one or more of: a device type of the second wireless device, a received signal strength of the message received from the second wireless device, and/or information included in the message from the second wireless device. In another aspect, the information included in the message may include an allowed interference level at an intended receiver of the message from the second wireless device, an allowed interference level at the second wireless device, a transmission power used to transmit the message, an MCS of data to be sent or received by the second wireless device, an indication of whether non-deferral is allowed, and/or a set of thresholds for the wireless communication device 900 to use for determining whether to defer. In another aspect, the communication deferral policy may instruct the wireless communication device 900 to defer communications when the message is associated with the BSS. In another aspect, the communication deferral policy may further instruct the wireless communication device 900 not to defer communications based on at least one of whether the message is associated with the OBSS, the second wireless device is of the first device type or a second device type, a received signal strength of the message is below a first threshold, the received signal strength of the message is below a RTS threshold if the message is an RTS message, the received signal strength of the message is below a CTS threshold if the message is a CTS message, the received signal strength of the message is below a second threshold associated with the wireless communication device 900, and/or a set of conditions for non-deferral included in the message are met. In another aspect, the communication deferral policy may instruct the wireless communication device 900 not to defer communications if the message is associated with the OBSS. In another aspect, the communication deferral policy may instruct the wireless communication device 900 not to defer communications if the message is associated with the OBSS and the received signal strength of the message is below the first threshold. In another aspect, the communication deferral policy may instruct the wireless communication device 900 not to defer communications if the second wireless device is of the first device type and the message is associated with the OBSS. In another aspect, the communication deferral policy may instruct the wireless communication device 900 not to defer communications based on a device type of the second wireless device and on the message type of the message. In another aspect, the communication deferral policy may instruct the wireless communication device 900 whether to allow OBSS reuse based on a set of conditions. In another aspect, the set of conditions may indicate that the wireless communication device 900 is allowed OBSS reuse if the wireless communication device 900 is less than a distance threshold from a serving AP. In another aspect, the set of conditions may indicate that the wireless communication device 900 is allowed OBSS reuse if the wireless communication device 900 is less than a distance threshold from a serving AP, and an interference level to the second wireless device due to OBSS reuse is less than a first interference level or the interference level to an intended recipient of the message due to OBSS reuse is less than a second interference level. In another configuration, the determination of whether the message is associated with the OBSS is based on a BSS identifier in the message. In another configuration, the means for determining the message type may be configured to determine whether the message is an RTS message, a CTS message, or a data packet. In another configuration, the means for determining the message type may be configured to perform at least one of determining whether the message is a first RTS type, a second RTS type, or a third RTS type when the message is an RTS message and/or by determining whether the message is a first CTS type, a second RTS type, or a third CTS type when the message is a CTS message. In another aspect, the first RTS type may include a BSS identifier in a receiver address field or a transmitter address field. In another aspect, the second RTS type may include a BSS identifier in a receiver address field or a transmitter address field and include a device type indicator in one or more of the receiver address field, the transmitter address field, a scrambling seed field, a signal field, a service field, or a frame control field. In another aspect, the third RTS type may include at least one of BSS identifier field and a device type indicator and may further include an RSSI threshold that enables the wireless communication device 900 to determine whether non-deferral is allowed, an allowed interference level at the second wireless device or at an intended receiver of the message to determine whether non-deferral is allowed, an MCS of data to be sent or received by the second wireless device, a set of performance requirements, or information about a buffer status associated with multiple traffic identifiers or access classes. In another aspect, the first CTS type may include a BSS identifier in a receiver address field if the wireless communication device 900 is a station. In this aspect, the second RTS type may include at least one of the BSS identifier or a device type indicator in one or more of the receiver address field, a scrambling seed field, a signal field, a service field, or a frame control field. In another aspect, the third CTS type may include at least one of BSS identifier field and a device type indicator. In this aspect, the third CTS type may further include an RSSI threshold that enables the wireless communication device 900 to determine whether non-deferral is allowed, an allowed interference level at the second wireless device or at an intended receiver of the message to determine whether non-deferral is allowed, an MCS of data to be sent or received by the second wireless device, and/or a set of performance requirements. In another configuration, the determination of whether the second wireless device is of the first device type or a second device type may be based on a device type indicator included in the message. The determination of whether to defer communications may be further based on whether the second wireless device is of the first device type or the second device type. In another configuration, the wireless communication device 900 may include means for transmitting a quiet interval to instruct wireless devices associated with the BSS to defer communications and means for transmitting a quiet element cancellation decodable by wireless devices of the first device type. In another configuration, the wireless communications device 900 may include means for transmitting an RTS message with a network allocation vector that only accounts for a CTS message, means for transmitting a RTS message or a CTS message that is not decodable by wireless device of a second device type, or means for transmitting a RTS message or a CTS message at a transmission power below a power threshold or at a transmission rate above a rate threshold. In another configuration, the wireless communications device 900 may include means for transmitting a second message. The second message may indicate that OBSS reuse is not allowed by indicating a reserved BSS identifier, in which the reserved BSS identifier indicates that OBSS reuse is disallowed, indicate that a BSS identifier is absent or invalid to disallow OBSS reuse, indicate that the second message is of a first RTS type or a first CTS type.

For example, means for determining a communication deferral policy may include the processing system 910 and/or the communication deferral component 924. Means for receiving may include the processing system 910, the communication deferral component 924, and/or the receiver 905. Means for determining a message type may include the processing system 910 and/or the communication deferral component 924. Means for determining whether the message is associated with an OBSS may include the processing system 910 and/or the communication deferral component 924. Means for determining whether to defer communications may include the processing system 910 and/or the communication deferral component 924. Means for receiving may include the processing system 910, the communication deferral component 924, and/or the receiver 905. Means for determining whether the second wireless device is of the first device type or a second device type may include the processing system 910 and/or the communication deferral component 924.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Figure 10:
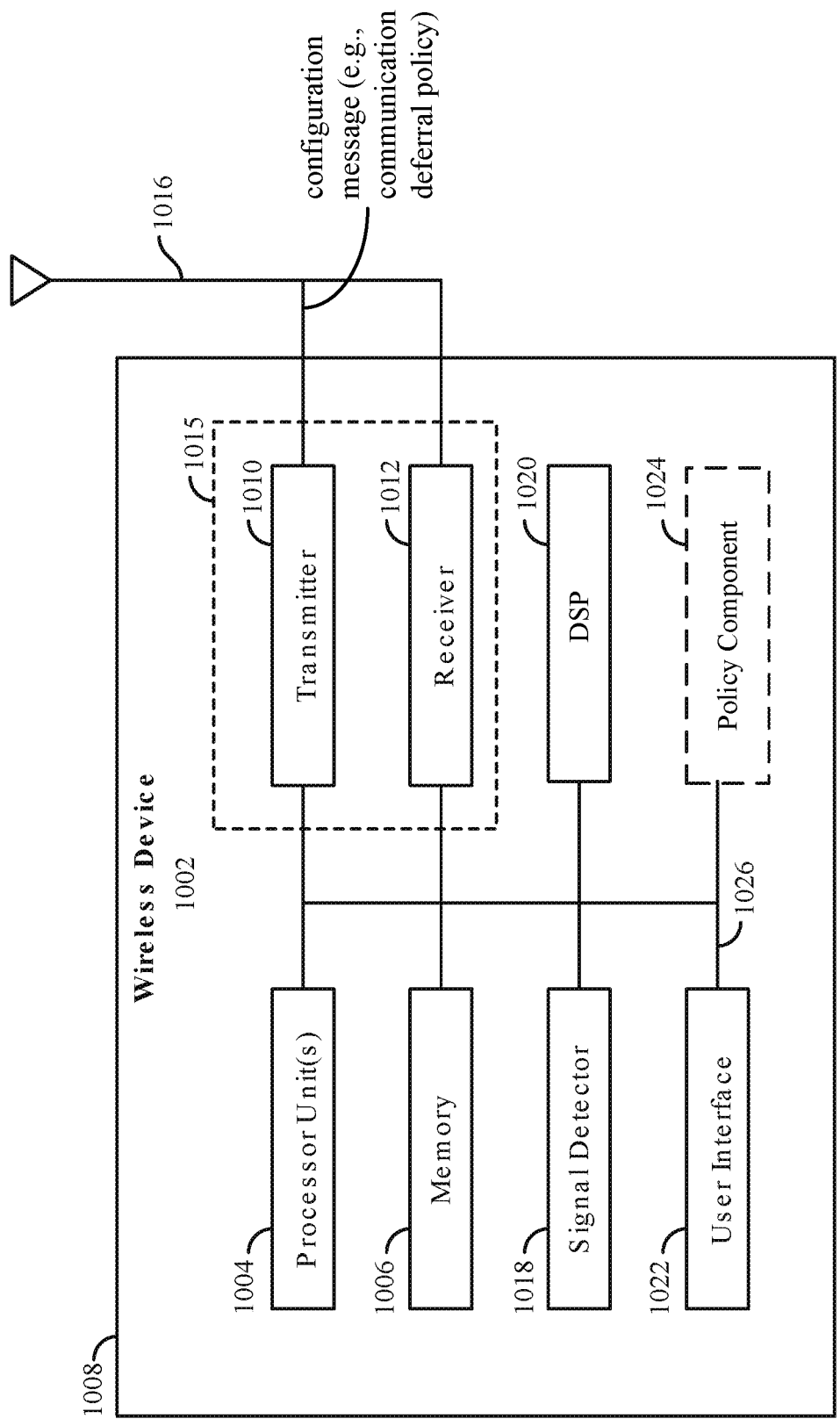
FIG. 10 shows an example functional block diagram of a wireless device that may determine whether to defer communications within and outside of the wireless communication system of FIG. 1.

FIG. 10 shows an example functional block diagram of a wireless device 1002 that may determine whether to defer communications within and outside of the wireless communication system 100 of FIG. 1. The wireless device 1002 is an example of a device that may be configured to implement the various methods described herein. For example, the wireless device 1002 may comprise the AP 104.

The wireless device 1002 may include a processor 1004 which controls operation of the wireless device 1002. The processor 1004 may also be referred to as a CPU. Memory 1006, which may include both ROM and RAM, may provide instructions and data to the processor 1004. A portion of the memory 1006 may also include NVRAM. The processor 1004 typically performs logical and arithmetic operations based on program instructions stored within the memory 1006. The instructions in the memory 1006 may be executable (by the processor 1004, for example) to implement the methods described herein.

The processor 1004 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1002 may also include a housing 1008, and the wireless device 1002 may include a transmitter 1010 and/or a receiver 1012 to allow transmission and reception of data between the wireless device 1002 and a remote device. The transmitter 1010 and the receiver 1012 may be combined into a transceiver 1014. An antenna 1016 may be attached to the housing 1008 and electrically coupled to the transceiver 1014. The wireless device 1002 may also include multiple transmitters, multiple receivers, multiple transceivers, and/or multiple antennas.

The wireless device 1002 may also include a signal detector 1018 that may be used to detect and quantify the level of signals received by the transceiver 1014 or the receiver 1012. The signal detector 1018 may detect such signals as total energy, energy per subcarrier per symbol, power spectral density, and other signals. The wireless device 1002 may also include a DSP 1020 for use in processing signals. The DSP 1020 may be configured to generate a packet for transmission. In some aspects, the packet may comprise a PPDU.

The wireless device 1002 may further comprise a user interface 1022 in some aspects. The user interface 1022 may comprise a keypad, a microphone, a speaker, and/or a display. The user interface 1022 may include any element or component that conveys information to a user of the wireless device 1002 and/or receives input from the user.

When the wireless device 1002 is implemented as an AP (e.g., the AP 104), the wireless device 1002 may also comprise a policy component 1024. The policy component 1024 may be configured to determine a communication deferral policy for a group of STAs within a BSS associated with the wireless device 1002 and to transmit a configuration message to the group of STAs. The configuration message may indicate the communication deferral policy. In one configuration, the policy component 1024 may be configured to determine the communication deferral policy by determining whether the group of STAs will defer to OBSS transmissions based on one or more conditions. In another aspect, the one or more conditions may include an effective BSS distance between the BSS and an OBSS. In another aspect, the communication deferral policy may instruct each STA within the group of STAs to defer communications when each STA receives a message from another STA in the BSS. In another aspect, the communication deferral policy may further instruct each STA within the group of STAs not to defer communications, when each STA receives the message from the another STA, based on at least one of whether the message is from an OBSS, the another STA is of a first device type or a second device type, a received signal strength of the message is below a threshold, the received signal strength of the message is below a second threshold indicated in the message, and/or requirements for non-deferral are met. In another aspect, the communication deferral policy may instruct the group of STAs whether to allow OBSS reuse based on a set of conditions. In another aspect, the group of STAs may be selected based on a distance from the wireless device 1002. In another aspect, the configuration message may include a group indicator associated with the group of STAs, and the group of STAs may be a subset of STAs in the BSS. In another aspect, the communication deferral policy may be based on a second communication deferral policy of a second AP. In another configuration, the policy component 1024 may be configured to determine the communication deferral policy by negotiating the communication deferral policy with a second AP.

The various components of the wireless device 1002 may be coupled together by a bus system 1026. The bus system 1026 may include a data bus, for example, as well as a power bus, a control signal bus, and a status signal bus in addition to the data bus. Components of the wireless device 1002 may be coupled together or accept or provide inputs to each other using some other mechanism.

Although a number of separate components are illustrated in FIG. 10, one or more of the components may be combined or commonly implemented. For example, the processor 1004 may be used to implement not only the functionality described above with respect to the processor 1004, but also to implement the functionality described above with respect to the signal detector 1018, the DSP 1020, the user interface 1022, and/or the policy component 1024. Further, each of the components illustrated in FIG. 10 may be implemented using a plurality of separate elements.

Figure 11:
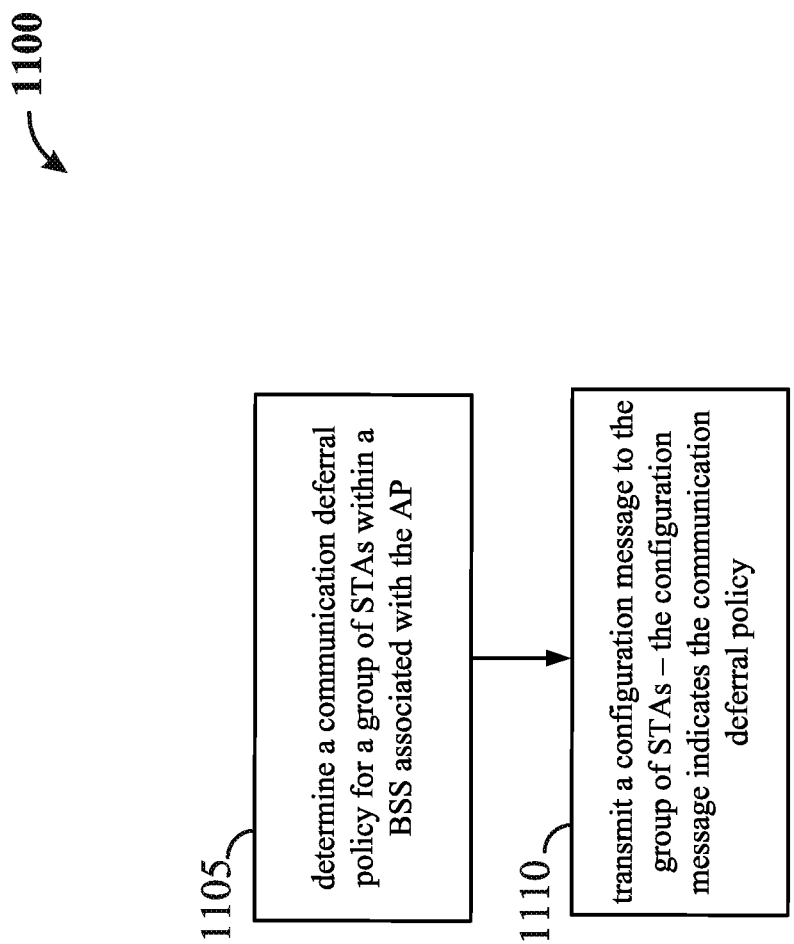
FIG. 11 is a flowchart of an example method for determining whether to defer communications in a wireless network.

FIG. 11 is a flowchart of an example method 1100 for determining whether to defer communications in a wireless network. The method 1100 may be performed using an apparatus (e.g., the AP 104, the first AP 602, the second AP 606, or the wireless device 1002, for example). Although the method 1100 is described below with respect to the elements of wireless device 1002 of FIG. 10, above, other components may be used to implement one or more of the steps described herein.

At block 1105, the apparatus may determine a communication deferral policy for a group of STAs within a BSS associated with the AP. For example, referring to FIG. 6, the first AP 602 may determine a communication deferral policy for the first STA 610 (and any other STAs within the first BSS 604 that are not shown in FIG. 6). The first AP 602 may determine the communication deferral policy by determining whether the group of STAs will defer to the OBSS based on one or more conditions. The one or more conditions may include an effective BSS distance between the BSS and the OBSS. The one or more conditions may include whether the group of STAs have good throughput (e.g., throughput above a threshold). The one or more conditions may include whether an OBSS is deferring to the BSS. In one aspect, the communication deferral policy may instruct each STA within the group of STAs to defer communications when each STA receives a message from another STA in the BSS. The message may be an RTS message, a CTS message, or a data packet. In another aspect, the communication deferral policy may further instruct each STA within the group of STAs not to defer communications, when each STA receives the message from the another STA, based on at least one of whether the message is from an OBSS, the another STA is of a first device type or a second device type, a received signal strength of the message is below a threshold, the received signal strength of the message is below a second threshold indicated in the message, or requirements for non-deferral are met. The requirements may be, for example, allowed interference levels as discussed herein. In another aspect, the communication deferral policy may instruct the group of STAs whether to allow OBSS reuse based on a set of conditions as described herein. In another aspect, the group of STAs may be selected based on a distance from the first AP 602. In another aspect, the communication deferral policy may be based on a second communication deferral policy of the second AP 606. In another aspect, the first AP 602 may determine the communication deferral policy be negotiating the communication deferral policy with the second AP 606.

At block 1110, the apparatus may transmit a configuration message to the group of STAs. The configuration message may indicate the communication deferral policy. In an aspect, the configuration message may include a group indicator associated with the group of STAs, in which the group of STAs is a subset of STAs in the BSS. For example, referring to FIG. 6, the first AP 602 may transmit a configuration message to the first STA 610 and any other STAs within BSS 1. In another aspect, the configuration message may include a group indicator associated with the group of STAs that have been selected, and the group of STAs may be a subset of STAs in BSS 1.

Figure 12:
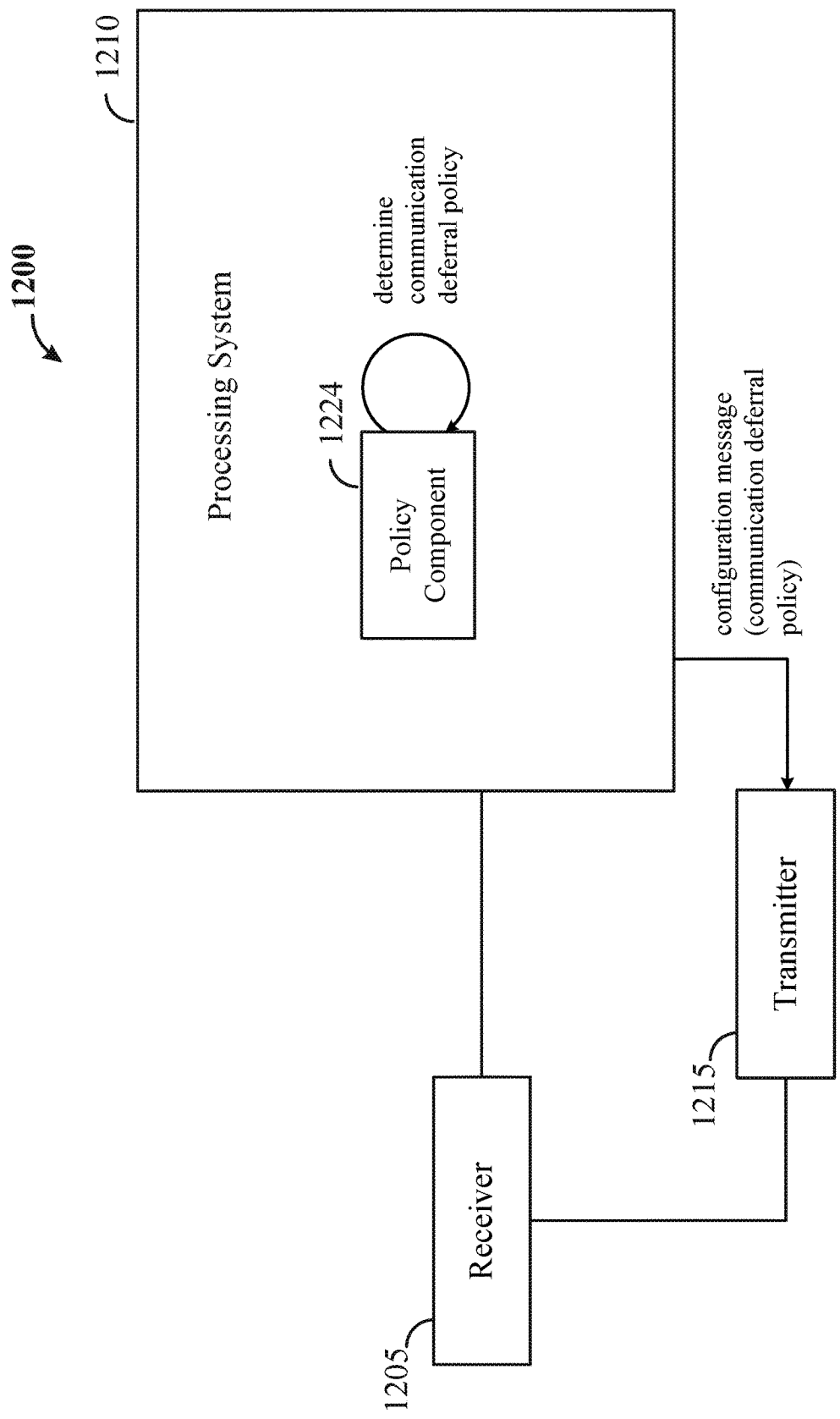
FIG. 12 is a functional block diagram of an example wireless communication device that may determine whether to defer communications in a wireless network.

FIG. 12 is a functional block diagram of an example wireless communication device 1200 that may determine whether to defer communications in a wireless network. The wireless communication device 1200 may include a receiver 1205, a processing system 1210, and a transmitter 1215. The processing system 1210 may include a policy component 1224. The policy component 1224 and/or the processing system 1210 may be configured to determine a communication deferral policy for a group of STAs within a BSS associated with the wireless communication device 1200. The processing system 1210, the policy component 1224, and/or the transmitter 1215 may be configured to transmit a configuration message to the group of STAs. The configuration message may indicate the communication deferral policy. In one configuration, the policy component 1224 and/or the processing system 1210 may be configured to determine the communication deferral policy by determining whether the group of STAs will defer to OBSS transmissions based on one or more conditions. In another aspect, the one or more conditions may include an effective BSS distance between the BSS and an OBSS. In another aspect, the communication deferral policy may instruct each STA within the group of STAs to defer communications when each STA receives a message from another STA in the BSS. In another aspect, the communication deferral policy may further instruct each STA within the group of STAs not to defer communications, when each STA receives the message from the another STA, based on at least one of whether the message is from an OBSS, the another STA is of a first device type or a second device type, a received signal strength of the message is below a threshold, the received signal strength of the message is below a second threshold indicated in the message, and/or requirements for non-deferral are met. In another aspect, the communication deferral policy may instruct the group of STAs whether to allow OBSS reuse based on a set of conditions. In another aspect, the group of STAs may be selected based on a distance from the wireless communication device 1200. In another aspect, the configuration message may include a group indicator associated with the group of STAs, and the group of STAs may be a subset of STAs in the BSS. In another aspect, the communication deferral policy may be based on a second communication deferral policy of a second AP. In another configuration, the policy component 1224 and/or the processing system 1210 may be configured to determine the communication deferral policy by negotiating the communication deferral policy with a second AP.

The receiver 1205, the processing system 1210, the policy component 1224, and/or the transmitter 1215 may be configured to perform one or more functions discussed above with respect to blocks 1105 and 1110 of FIG. 11. The receiver 1205 may correspond to the receiver 1012. The processing system 1210 may correspond to the processor 1004. The transmitter 1215 may correspond to the transmitter 1010. The policy component 1224 may correspond to the policy component 1024.

In one configuration, the wireless communication device 1200 may include means for determining a communication deferral policy for a group of STAs within a BSS associated with the wireless communication device 1200. The wireless communication device 1200 may include means for transmitting a configuration message to the group of STAs. The configuration message may indicate the communication deferral policy. In one configuration, the means for determining the communication deferral policy may be configured to determine whether the group of STAs will defer to OBSS transmissions based on one or more conditions. In another aspect, the one or more conditions may include an effective BSS distance between the BSS and an OBSS. In another aspect, the communication deferral policy may instruct each STA within the group of STAs to defer communications when each STA receives a message from another STA in the BSS. In another aspect, the communication deferral policy may further instruct each STA within the group of STAs not to defer communications, when each STA receives the message from the another STA, based on at least one of whether the message is from an OBSS, the another STA is of a first device type or a second device type, a received signal strength of the message is below a threshold, the received signal strength of the message is below a second threshold indicated in the message, and/or requirements for non-deferral are met. In another aspect, the communication deferral policy may instruct the group of STAs whether to allow OBSS reuse based on a set of conditions. In another aspect, the group of STAs may be selected based on a distance from the wireless communication device 1200. In another aspect, the configuration message may include a group indicator associated with the group of STAs, and the group of STAs may be a subset of STAs in the BSS. In another aspect, the communication deferral policy may be based on a second communication deferral policy of a second AP. In another configuration, the means for determining the communication deferral policy may be configured to negotiate the communication deferral policy with a second AP.

For example, means for determining a communication deferral policy may include the processing system 1210 and/or the policy component 1224. Means for transmitting may include the processing system 1210, the policy component 1224, and/or the transmitter 1215.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an ASIC, an FPGA, or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a first wireless device of a first device type, comprising:
   determining a communication deferral policy within a basic service set (BSS) associated with the first wireless device;
   receiving a message from a second wireless device;
   determining a message type of the message;
   determining a device type of the second wireless device based on the message;

determining whether the message is associated with an overlapping basic service set (OBSS) based on the message; and determining whether to defer communications based on the communication deferral policy, the message type, the device type of the second wireless device, and whether the message is associated with the OBSS, wherein the communications are capable of being deferred if the second wireless device is a second device type that is different from the first device type.

2. The method of claim 1, further comprising receiving a configuration message, wherein the configuration message includes the communication deferral policy that indicates whether to defer communications based on whether the message is from the BSS of the first wireless device or from an OBSS of the first wireless device, the communication deferral policy is determined based on the configuration message, and the configuration message is received from an access point in the same BSS as the first wireless device.

3. The method of claim 1, wherein the determining whether the message is associated with the OBSS is further based on a BSS identifier in the message.

4. The method of claim 1, further comprising:
determining whether the second wireless device is of the first device type or the second device type based on a device type indicator included in the message, wherein the determination of whether to defer communications is further based on whether the second wireless device is of the first device type or the second device type.

5. The method of claim 1, further comprising:
transmitting a quiet interval to instruct wireless devices associated with the BSS to defer communications; and
transmitting a quiet element cancellation decodable by wireless devices of the first device type.

6. The method of claim 1, further comprising:
transmitting a request to send (RTS) message with a network allocation vector that only accounts for a clear to send (CTS) message;
transmitting a RTS message or a CTS message that is not decodable by wireless device of the second device type; or
transmitting a RTS message or a CTS message at a transmission power below a power threshold or at a transmission rate above a rate threshold.

7. The method of claim 1, further comprising transmitting a second message, wherein the second message indicates that OBSS reuse is not allowed by indicating:
a reserved BSS identifier, the reserved BSS identifier indicating that OBSS reuse is disallowed;
a BSS identifier is absent or invalid to disallow OBSS reuse; or
the second message is of a first request to send (RTS) type or a first clear to send (CTS) type.

8. The method of claim 1, wherein the determining the message type of the message comprises determining whether the message is a request to send (RTS) message, a clear to send (CTS) message, or a data packet.

9. An apparatus for wireless communication, the apparatus being a first wireless device of a first device type, comprising:
means for determining a communication deferral policy within a basic service set (BSS) associated with the first wireless device;
means for receiving a message from a second wireless device;
means for determining a message type of the message;

means for determining a device type of the second wireless device based on the message;
means for determining whether the message is associated with an overlapping basic service set (OBSS) based on the message; and
means for determining whether to defer communications based on the communication deferral policy, the message type, the device type of the second wireless type, and whether the message is associated with the OBSS, wherein the communications are capable of being deferred if the second wireless device is a second device type that is different from the first device type.

10. The apparatus of claim 9, further comprising means for receiving a configuration message, wherein the configuration message includes the communication deferral policy that indicates whether to defer communications based on whether the message is from the BSS of the first wireless device or from an OBSS of the first wireless device, and the communication deferral policy is determined based on the configuration message.

11. An apparatus for wireless communication, the apparatus being a first wireless device of a first device type, comprising:
a memory; and
at least one processor coupled to the memory and configured to:
determine a communication deferral policy within a basic service set (BSS) associated with the first wireless device;
receive a message from a second wireless device;
determine a message type of the message;
determine a device type of the second wireless device based on the message;
determine whether the message is associated with an overlapping basic service set (OBSS) based on the message; and
determine whether to defer communications based on the communication deferral policy, the message type, the device type of the second wireless device, and whether the message is associated with the OBSS, wherein the communications are capable of being deferred if the second wireless device is a second device type that is different from the first device type.

12. The apparatus of claim 11, wherein the at least one processor is further configured to receive a configuration message, wherein the configuration message includes the communication deferral policy that indicates whether to defer communications based on whether the message is from the BSS of the first wireless device or from an OBSS of the first wireless device, and the communication deferral policy is determined based on the configuration message.

13. The apparatus of claim 11, wherein the communication deferral policy instructs the first wireless device whether to defer based on one or more of:
the device type of the second wireless device;
a received signal strength of the message received from the second wireless device;
information included in the message from the second wireless device.

14. The apparatus of claim 13, wherein the information included in the message comprises:
an allowed interference level at an intended receiver of the message from the second wireless device;
an allowed interference level at the second wireless device;
a transmission power used to transmit the message;

a modulation and coding scheme (MCS) of data to be sent or received by the second wireless device;
an indication of whether non-deferral is allowed; or
a set of thresholds for the first wireless device to use for determining whether to defer.

15. The apparatus of claim 11, wherein the communication deferral policy instructs the first wireless device to defer communications when the message is associated with the BSS.

16. The apparatus of claim 15, wherein the communication deferral policy further instructs the first wireless device not to defer communications based on at least one of whether:
the message is associated with the OBSS;
the second wireless device is of the first device type or the second device type;
a received signal strength of the message is below a first threshold;
the received signal strength of the message is below a request to send (RTS) threshold if the message is an RTS message;
the received signal strength of the message is below a clear to send (CTS) threshold if the message is a CTS message;
the received signal strength of the message is below a second threshold associated with the first wireless device; or
a set of conditions for non-deferral included in the message are met.

17. The apparatus of claim 16, wherein the communication deferral policy instructs the first wireless device not to defer communications if the message is associated with the OBSS.

18. The apparatus of claim 16, wherein the communication deferral policy instructs the first wireless device not to defer communications if the message is associated with the OBSS and the received signal strength of the message is below the first threshold.

19. The apparatus of claim 16, wherein the communication deferral policy instructs the first wireless device not to defer communications if the second wireless device is of the first device type and the message is associated with the OBSS.

20. The apparatus of claim 16, wherein the communication deferral policy instructs the first wireless device not to defer communications based on the device type of the second wireless device and on the message type of the message.

21. The apparatus of claim 11, wherein the communication deferral policy instructs the first wireless device whether to allow OBSS reuse based on a set of conditions.

22. The apparatus of claim 21, wherein the set of conditions indicates that the first wireless device is allowed OBSS reuse if the first wireless device is less than a distance threshold from a serving AP.

23. The apparatus of claim 21, wherein the set of conditions indicates that the first wireless device is allowed OBSS reuse if the first wireless device is less than a distance threshold from a serving AP and, an interference level to the second wireless device due to OBSS reuse is less than a first interference level or the interference level to an intended recipient of the message due to OBSS reuse is less than a second interference level.

24. The apparatus of claim 11, wherein the at least one processor is configured to determine the message type by determining whether the message is a request to send (RTS) message, a clear to send (CTS) message, or a data packet.

25. The apparatus of claim 24, wherein the at least one processor is further configured to determine the message type by performing at least one of:
determining whether the message is a first RTS type, a second RTS type, or a third RTS type when the message is an RTS message;
determining whether the message is a first CTS type, a second CTS type, or a third CTS type when the message is a CTS message.

26. The apparatus of claim 25, wherein the first RTS type includes a BSS identifier in a receiver address field or a transmitter address field.

27. The apparatus of claim 25, wherein the second RTS type includes a BSS identifier in a receiver address field or a transmitter address field and includes a device type indicator in one or more of the receiver address field, the transmitter address field, a scrambling seed field, a signal field, a service field, or a frame control field.

28. The apparatus of claim 25, wherein the third RTS type includes at least one of BSS identifier field and a device type indicator and further comprises:
a received signal strength indicator (RSSI) threshold that enables the first wireless device to determine whether non-deferral is allowed;
an allowed interference level at the second wireless device or at an intended receiver of the message to determine whether non-deferral is allowed;
an modulation and coding scheme (MCS) of data to be sent or received by the second wireless device;
a set of performance requirements; or
information about a buffer status associated with multiple traffic identifiers or access classes.

29. The apparatus of claim 25, wherein the first CTS type includes a BSS identifier in a receiver address field if the first wireless device is a station, and wherein the second CTS type includes at least one of the BSS identifier or a device type indicator in one or more of the receiver address field, a scrambling seed field, a signal field, a service field, or a frame control field.

30. The apparatus of claim 25, wherein the third CTS type includes at least one of BSS identifier field and a device type indicator and further comprises:
a received signal strength indicator (RSSI) threshold that enables the first wireless device to determine whether non-deferral is allowed;
an allowed interference level at the second wireless device or at an intended receiver of the message to determine whether non-deferral is allowed;
an modulation and coding scheme (MCS) of data to be sent or received by the second wireless device; or
a set of performance requirements.

31. A non-transitory computer-readable medium of a first wireless device of a first device type storing computer executable code, comprising code to:
determine a communication deferral policy within a basic service set (BSS) associated with the first wireless device;
receive a message from a second wireless device;
determine a message type of the message;
determine a device type of the second wireless device based on the message;
determine whether the message is associated with an overlapping basic service set (OBSS) based on the message; and
determine whether to defer communications based on the communication deferral policy, the message type, the device type of the second wireless device, and whether the message is associated with the OBSS, wherein the communications are capable of being deferred if the second wireless device is a second device type that is different from the first device type.

* * * * *